US012659969B2

(12) United States Patent
Khoshnevisan et al.

(10) Patent No.: US 12,659,969 B2
(45) Date of Patent: Jun. 16, 2026

(54) PHYSICAL DOWNLINK CONTROL CHANNEL MONITORING OCCASION-BASED CODEBOOK GENERATION ACCORDING TO VARYING CODEBOOK GENERATION CHARACTERISTICS

(71) Applicant: QUALCOMM Incorporated, San Diego, CA (US)

(72) Inventors: Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/344,781

(22) Filed: Jun. 29, 2023

(65) Prior Publication Data

US 2025/0008525 A1     Jan. 2, 2025

(51) Int. Cl.
| | |
|---|---|
| *H04W 4/00* | (2018.01) |
| *H04W 72/0446* | (2023.01) |
| *H04W 72/232* | (2023.01) |
| *H04W 72/563* | (2023.01) |

(52) U.S. Cl.
CPC ..... *H04W 72/232* (2023.01); *H04W 72/0446* (2013.01); *H04W 72/563* (2023.01)

(58) Field of Classification Search
None
See application file for complete search history.

(56) References Cited

U.S. PATENT DOCUMENTS

| | | | |
|---|---|---|---|
| 11,177,909 B2 | 11/2021 | Zhang et al. | |
| 11,855,780 B2 | 12/2023 | Zhang et al. | |
| 2019/0306878 A1 | 10/2019 | Zhang et al. | |
| 2021/0099956 A1 | 4/2021 | Nam et al. | |
| 2022/0311549 A1* | 9/2022 | He | H04W 72/23 |
| 2023/0019320 A1* | 1/2023 | Huang | H04L 1/1854 |
| 2023/0328727 A1* | 10/2023 | Salah | H04L 5/0055 |
| | | | 370/329 |

FOREIGN PATENT DOCUMENTS

| | | |
|---|---|---|
| WO | WO-2019212628 A1 | 11/2019 |
| WO | WO-2023077434 A1 | 5/2023 |

OTHER PUBLICATIONS

International Search Report and Written Opinion—PCT/US2024/032422—ISA/EPO—Oct. 16, 2024.

* cited by examiner

*Primary Examiner* — Zewdu A Beyen
(74) *Attorney, Agent, or Firm* — Holland & Hart LLP

(57) ABSTRACT

Methods, systems, and devices for wireless communication are described. A user equipment (UE) may receive a downlink control information (DCI) message indicating a time slot for the UE to transmit feedback according to a codebook size. The UE may monitor a quantity of physical downlink control channel monitoring occasions (PMOs) within a subset of time slots before the time slot. The PMOs may include a first set of one or more PMOs associated with a first codebook generation characteristic and a second set of one or more PMOs associated with a second codebook generation characteristic. The UE may transmit the feedback via the time slot according to a first codebook size based on the monitoring. The first codebook size may be based on a quantity of PMOs included in the first set of PMOs associated with the first codebook generation characteristic.

30 Claims, 21 Drawing Sheets

310-a — PDSCH Resources Associated With First CORESET Pool 310-b — PDSCH Resources Associated With Second CORESET Pool 320 — Uplink Resources 300-a 300-b First Priority Second Priority 405 — DCI Message 410 — Downlink Message 415 — Feedback Message

400

130        105                    115

Network
Entity

Transceiver                    Antenna 1510                           1515

Communications
Manager

Memory

Code

1530

1525

1520

1540

Processor

1535

1505

1500

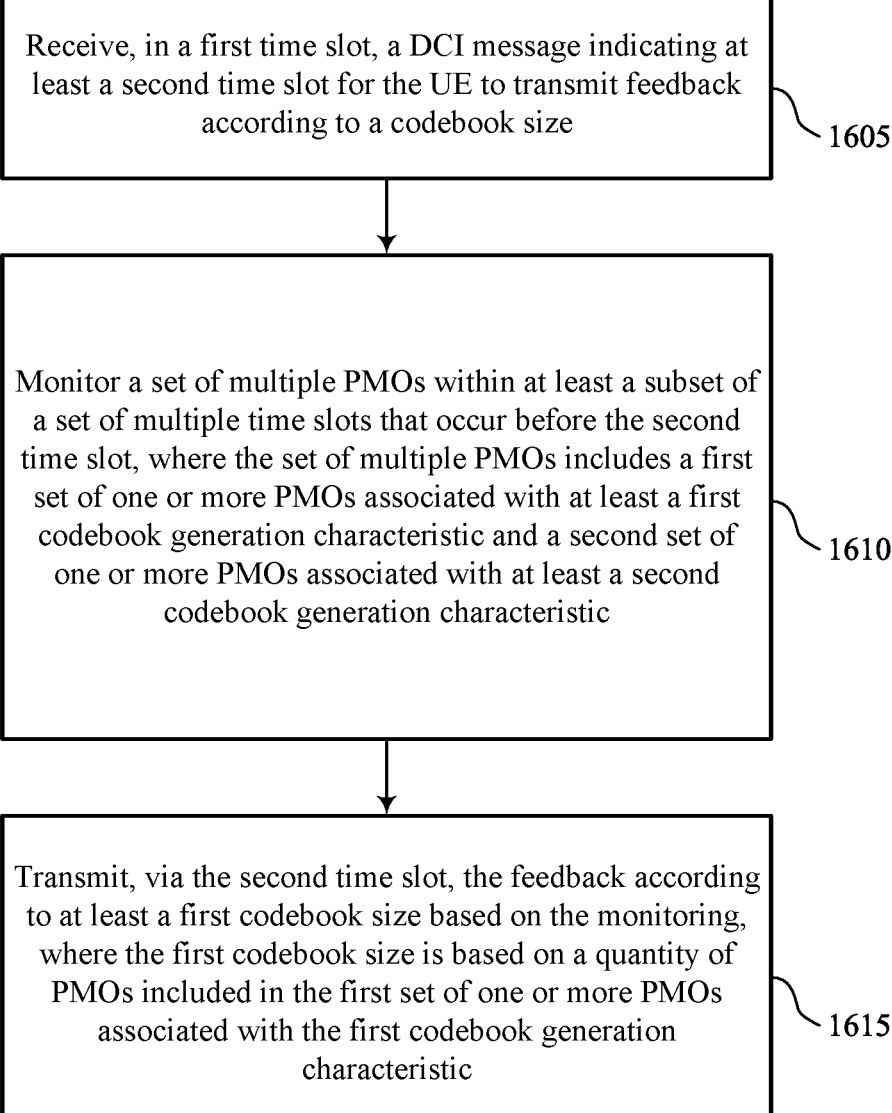

Receive, in a first time slot, a DCI message indicating at least a second time slot for the UE to transmit feedback according to a codebook size

1605

Monitor a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic

1610

Transmit, via the second time slot, the feedback according to at least a first codebook size based on the monitoring, where the first codebook size is based on a quantity of PMOs included in the first set of one or more PMOs associated with the first codebook generation characteristic

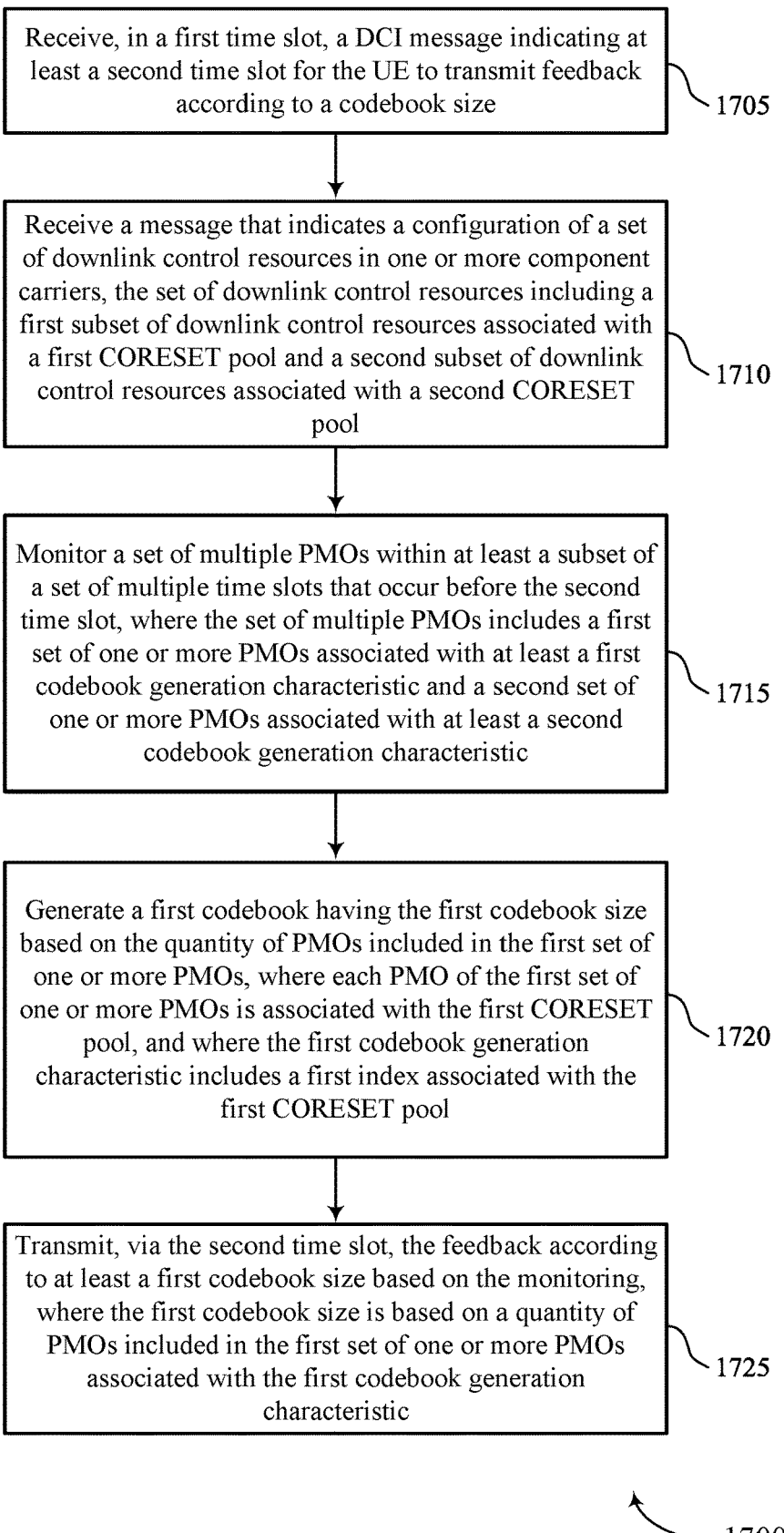

Receive, in a first time slot, a DCI message indicating at least a second time slot for the UE to transmit feedback according to a codebook size ⟩ 1705

Receive a message that indicates a configuration of a set of downlink control resources in one or more component carriers, the set of downlink control resources including a first subset of downlink control resources associated with a first CORESET pool and a second subset of downlink control resources associated with a second CORESET pool ⟩ 1710

Monitor a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic ⟩ 1715

Generate a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool ⟩ 1720

Transmit, via the second time slot, the feedback according to at least a first codebook size based on the monitoring, where the first codebook size is based on a quantity of PMOs included in the first set of one or more PMOs associated with the first codebook generation characteristic ⟩ 1725

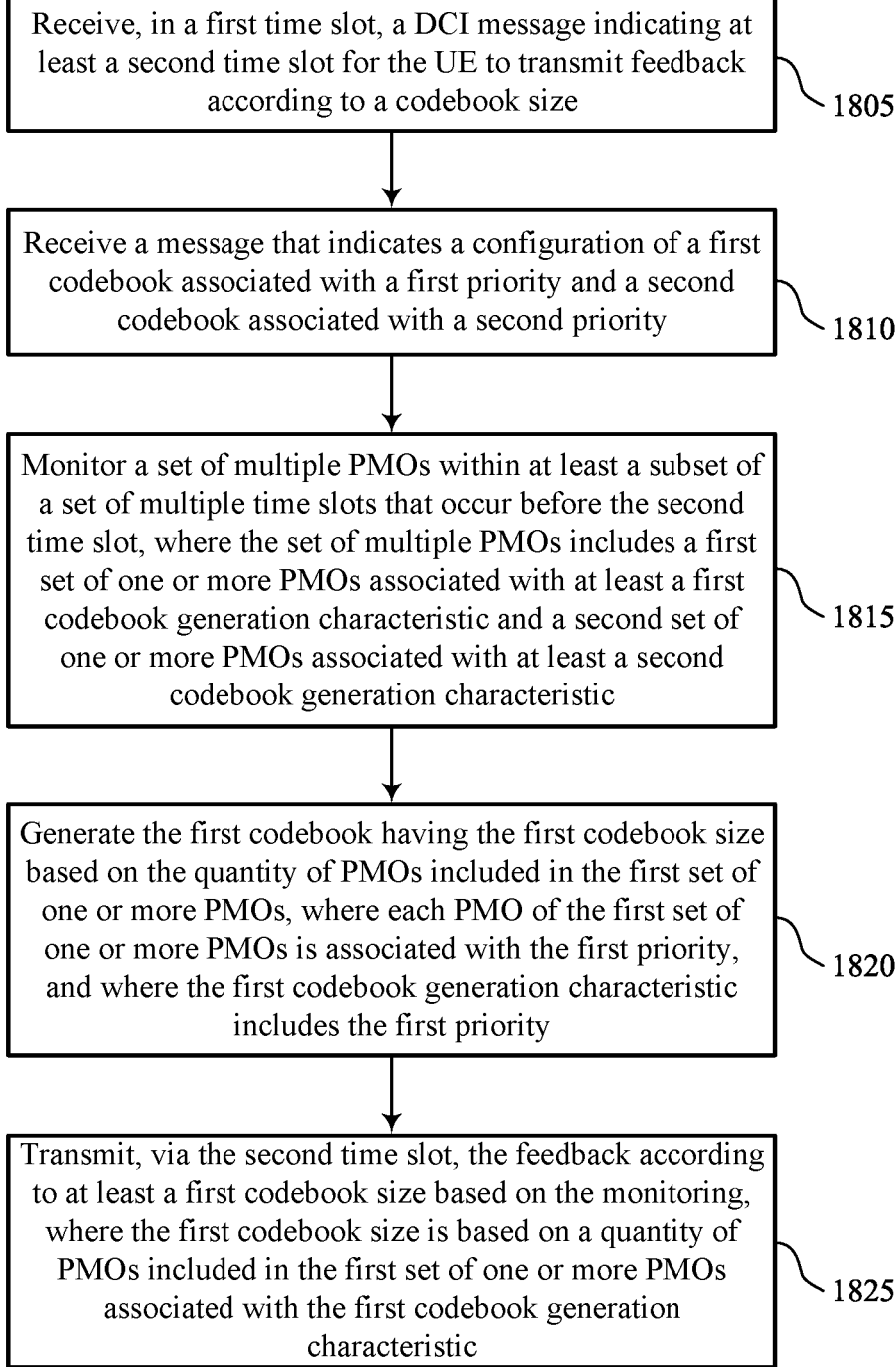

Receive, in a first time slot, a DCI message indicating at least a second time slot for the UE to transmit feedback according to a codebook size

1805

Receive a message that indicates a configuration of a first codebook associated with a first priority and a second codebook associated with a second priority

1810

Monitor a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic

1815

Generate the first codebook having the first codebook size based on the quantity of PMOs included in the first set of one or more PMOs, where each PMO of the first set of one or more PMOs is associated with the first priority, and where the first codebook generation characteristic includes the first priority

1820

Transmit, via the second time slot, the feedback according to at least a first codebook size based on the monitoring, where the first codebook size is based on a quantity of PMOs included in the first set of one or more PMOs associated with the first codebook generation characteristic

Figure 19:
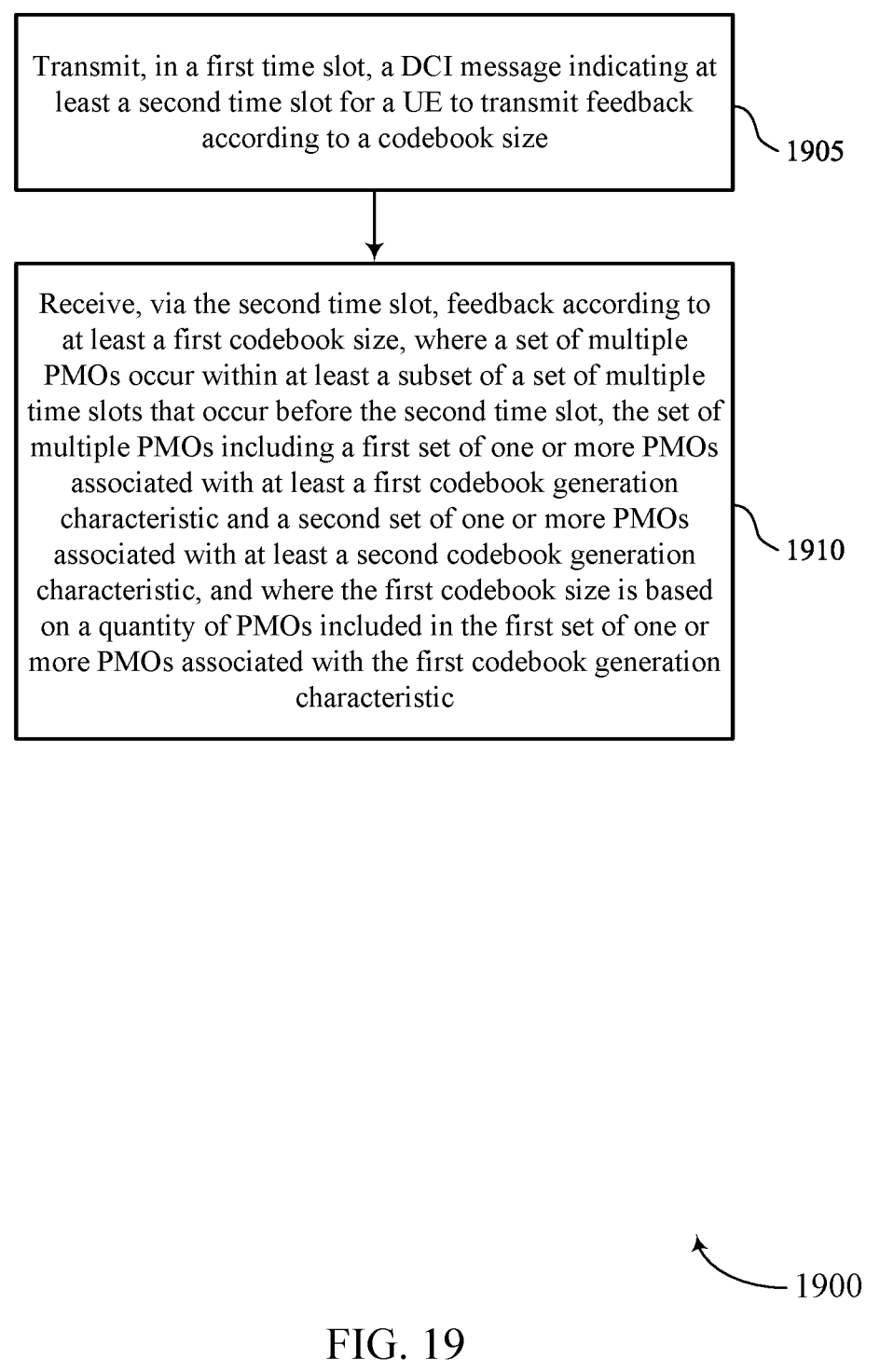

Transmit, in a first time slot, a DCI message indicating at least a second time slot for a UE to transmit feedback according to a codebook size ⟍ 1905

↓

Receive, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic ⟍ 1910

Figure 20:
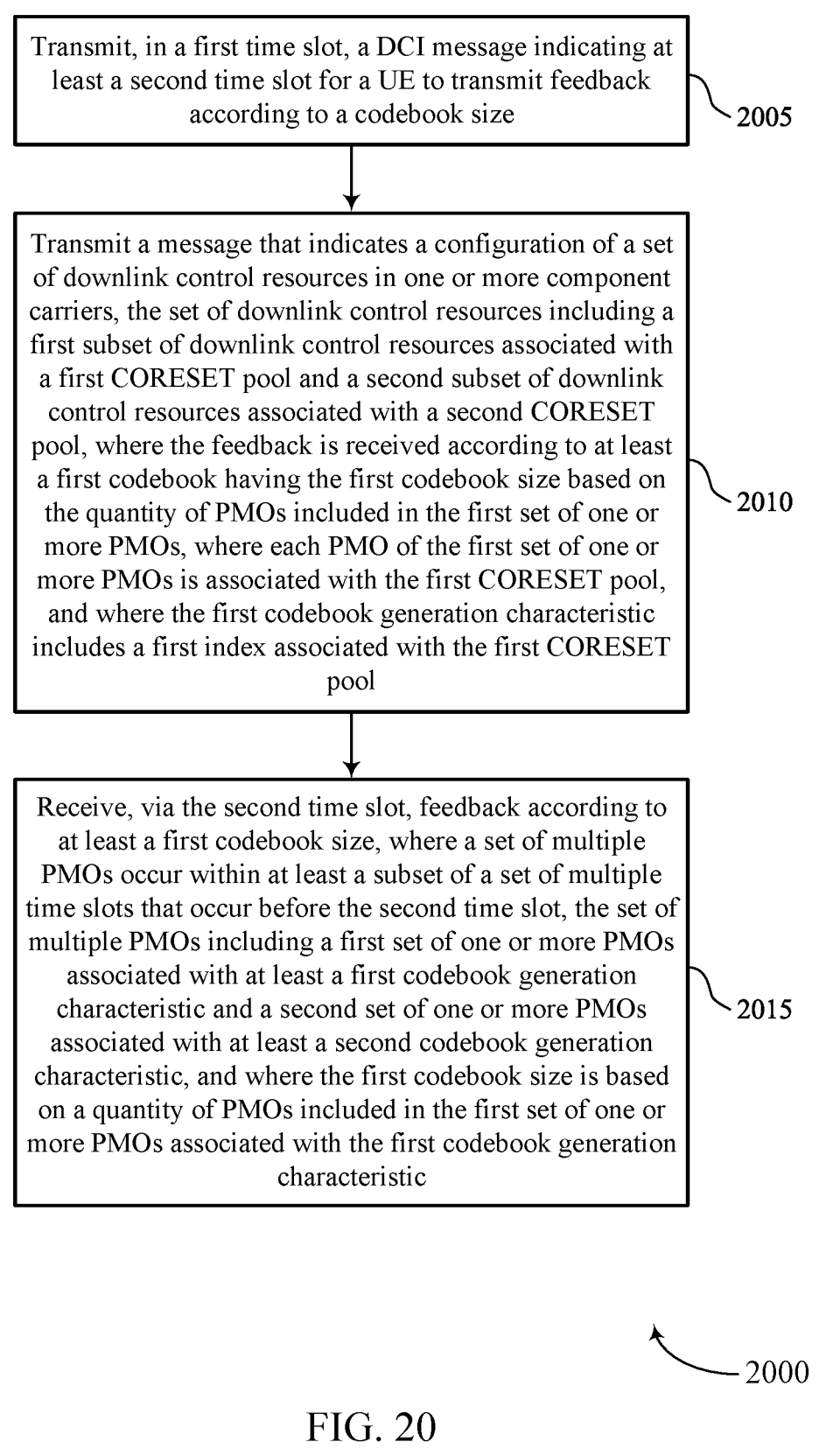

Transmit, in a first time slot, a DCI message indicating at least a second time slot for a UE to transmit feedback according to a codebook size

⟩ 2005

Transmit a message that indicates a configuration of a set of downlink control resources in one or more component carriers, the set of downlink control resources including a first subset of downlink control resources associated with a first CORESET pool and a second subset of downlink control resources associated with a second CORESET pool, where the feedback is received according to at least a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool

⟩ 2010

Receive, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic

Figure 21:
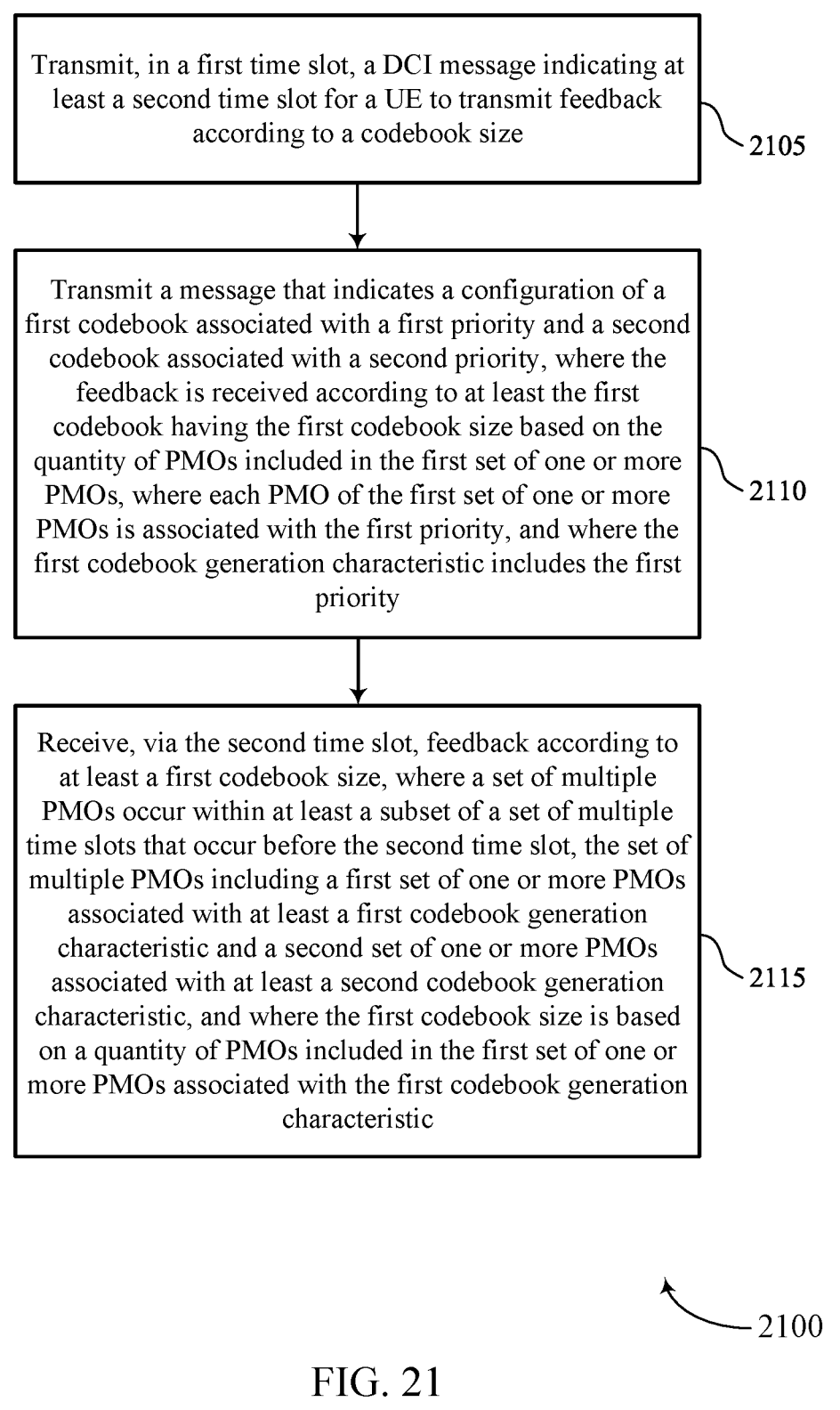

Transmit, in a first time slot, a DCI message indicating at least a second time slot for a UE to transmit feedback according to a codebook size

2105

Transmit a message that indicates a configuration of a first codebook associated with a first priority and a second codebook associated with a second priority, where the feedback is received according to at least the first codebook having the first codebook size based on the quantity of PMOs included in the first set of one or more PMOs, where each PMO of the first set of one or more PMOs is associated with the first priority, and where the first codebook generation characteristic includes the first priority

2110

Receive, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic

PHYSICAL DOWNLINK CONTROL CHANNEL MONITORING OCCASION-BASED CODEBOOK GENERATION ACCORDING TO VARYING CODEBOOK GENERATION CHARACTERISTICS

FIELD OF TECHNOLOGY

The present disclosure relates to wireless communication, including physical downlink control channel monitoring occasion (PMO)-based codebook generation according to varying codebook generation characteristics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some cases, a wireless communications system may support one or more wireless devices configured with feedback codebooks.

SUMMARY

The described techniques relate to improved methods, systems, devices, and apparatuses that support physical downlink control channel (PDCCH) monitoring occasion (PMO)-based codebook generation according to varying codebook generation characteristics. For example, the described techniques provide for a user equipment (UE) to receive, in a first time slot, a downlink control information (DCI) message that indicates a second time slot for the UE to transmit feedback according to a codebook size. The UE may monitor a quantity of PMOs within a subset of time slots before the second time slot. The quantity of PMOs that the UE monitors may include a first set of one or more PMOs associated with a first codebook generation characteristic and a second set of one or more PMOs associated with a second codebook generation characteristic. The first codebook generation characteristic, the second codebook generation characteristic, or both may correspond to an index associated with a set of downlink control resources, a transmission priority, a type of communications, or some other type of characteristic. The UE may transmit the feedback via the second time slot according to a first codebook size based on the monitoring. The first codebook size may be based on a quantity of PMOs included in the first set of PMOs associated with the first codebook generation characteristics.

A method for wireless communication at a UE is described. The method may include receiving, in a first time slot, a downlink control information (DCI) message indicating at least a second time slot for the UE to transmit feedback according to a codebook size, monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic, and transmitting, via the second time slot, the feedback according to at least a first codebook size based on the monitoring, where the first codebook size is based on a quantity of PMOs included in the first set of one or more PMOs associated with the first codebook generation characteristic.

An apparatus for wireless communication is described. The apparatus may include at least one memory and at least one processor coupled to the at least one memory. The at least one processor may be configured to receive, in a first time slot, a DCI message indicating at least a second time slot for the UE to transmit feedback according to a codebook size, monitor a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic, and transmit, via the second time slot, the feedback according to at least a first codebook size based on the monitoring, where the first codebook size is based on a quantity of PMOs included in the first set of one or more PMOs associated with the first codebook generation characteristic.

Another apparatus for wireless communication is described. The apparatus may include means for receiving, in a first time slot, a DCI message indicating at least a second time slot for the UE to transmit feedback according to a codebook size, means for monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic, and means for transmitting, via the second time slot, the feedback according to at least a first codebook size based on the monitoring, where the first codebook size is based on a quantity of PMOs included in the first set of one or more PMOs associated with the first codebook generation characteristic.

A non-transitory computer-readable medium storing code for wireless communication at a UE is described. The code may include instructions executable by one or more processors to receive, in a first time slot, a DCI message indicating at least a second time slot for the UE to transmit feedback according to a codebook size, monitor a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic, and transmit, via the second time slot, the feedback according to at least a first codebook size based on the monitoring, where the first codebook size is based on a quantity of PMOs included in the first set of one or more PMOs associated with the first codebook generation characteristic.

Some examples of the method, apparatuses, and non-transitory computer-readable medium described herein may further include operations, features, means, or instructions for receiving a message that indicates a configuration of a set of downlink control resources in one or more component carriers, the set of downlink control resources including a first subset of downlink control resources associated with a first control resource set (CORESET) pool and a second subset of downlink control resources associated with a second CORESET pool and generating a first codebook having the first codebook size based on the quantity of PMOs included in the first set of one or more PMOs, where each PMO of the first set of one or more PMOs may be associated with the first CORESET pool, and where the first codebook generation characteristic includes a first index associated with the first CORESET pool.

Some examples of the method, apparatuses, and non-transitory computer-readable medium described herein may further include operations, features, means, or instructions for generating a second codebook having a second codebook size based on a second quantity of PMOs included in the second set of one or more PMOs, where each PMO of the second set of one or more PMOs may be associated with the second CORESET pool, and where the second codebook generation characteristic includes a second index associated with the second CORESET pool.

Some examples of the method, apparatuses, and non-transitory computer-readable medium described herein may further include operations, features, means, or instructions for concatenating the first codebook with a second codebook having a second codebook size that may be based on a second quantity of PMOs included in the second set of one or more PMOs, where the feedback may be transmitted via a same uplink resource in the second time slot according to a combination of the first codebook size and the second codebook size based on the concatenating.

Some examples of the method, apparatuses, and non-transitory computer-readable medium described herein may further include operations, features, means, or instructions for transmitting, via a second uplink resource, second feedback according to a second codebook having a second codebook size that may be based on a second quantity of PMOs included in the second set of one or more PMOs and associated with the second CORESET pool, where the second uplink resource may be different than a first uplink resource via which the feedback may be transmitted according to the first codebook having the first codebook size.

In some examples of the method, apparatuses, and non-transitory computer-readable medium described herein, at least one PMO of the quantity of PMOs may be included in both the first set of one or more PMOs and the second set of one or more PMOs based on the at least one PMO being associated with both the first CORESET pool and the second CORESET pool.

Some examples of the method, apparatuses, and non-transitory computer-readable medium described herein may further include operations, features, means, or instructions for receiving a message that indicates a configuration of a first codebook associated with a first priority and a second codebook associated with a second priority and generating the first codebook having the first codebook size based on the quantity of PMOs included in the first set of one or more PMOs, where each PMO of the first set of one or more PMOs may be associated with the first priority, and where the first codebook generation characteristic includes the first priority.

Some examples of the method, apparatuses, and non-transitory computer-readable medium described herein may further include operations, features, means, or instructions for generating the second codebook having a second codebook size based on a second quantity of PMOs included in the second set of one or more PMOs, where each PMO in the second set of one or more PMOs may be associated with the second priority, and where the second codebook generation characteristic includes the second priority.

Some examples of the method, apparatuses, and non-transitory computer-readable medium described herein may further include operations, features, means, or instructions for receiving, via the first set of one or more PMOs, a first set of one or more DCI messages, where the first set of one or more PMOs may be associated with the first priority based on each DCI message of the first set of one or more DCI messages being associated with a first format and including a priority field configured to indicate a priority of a transmission associated with the respective DCI message and receiving, via the second set of one or more PMOs, a second set of one or more DCI messages, where the second set of one or more PMOs may be associated with the second priority based on each DCI message of the second set of one or more DCI messages being associated with the first format and including the priority field or being associated with a second format that does not include the priority field.

Some examples of the method, apparatuses, and non-transitory computer-readable medium described herein may further include operations, features, means, or instructions for transmitting, via a second uplink resource, second feedback according to the second codebook having a second codebook size that may be based on a second quantity of PMOs included in the second set of one or more PMOs and associated with the second priority, where the second uplink resource may be different than a first uplink resource via which the feedback may be transmitted according to the first codebook having the first codebook size.

In some examples of the method, apparatuses, and non-transitory computer-readable medium described herein, at least one PMO of the set of multiple PMOs may be included in both the first set of one or more PMOs and the second set of one or more PMOs based on the at least one PMO being associated with both the first priority and the second priority.

Some examples of the method, apparatuses, and non-transitory computer-readable medium described herein may further include operations, features, means, or instructions for receiving a message that indicates a first type of codebook associated with the first codebook generation characteristic and a second type of codebook associated with the second codebook generation characteristic, the first type of codebook including a PMO-based codebook, and the second type of codebook including one of a semi-static codebook or a dynamic codebook, generating a first codebook associated with the first codebook size according to the first type of codebook and based on the quantity of PMOs included in the first set of one or more PMOs associated with the first codebook generation characteristic, and generating a second codebook associated with a second codebook size according to the second type of codebook and either a quantity of physical downlink shared channel reception occasions or a quantity of downlink assignment indices monitored by the UE via the set of multiple PMOs.

Some examples of the method, apparatuses, and non-transitory computer-readable medium described herein may further include operations, features, means, or instructions for concatenating the first codebook with the second codebook, where the feedback may be transmitted via a same uplink resource in the second time slot according to a combination of the first codebook size and the second codebook size based on the concatenating.

Some examples of the method, apparatuses, and non-transitory computer-readable medium described herein may further include operations, features, means, or instructions for transmitting, via a second uplink resource, second feedback according to the second codebook size, where the second uplink resource may be different than a first uplink resource via which the feedback may be transmitted.

In some examples of the method, apparatuses, and non-transitory computer-readable medium described herein, the first codebook generation characteristic include a unicast communication type associated with the first set of one or more PMOs and the second codebook generation characteristic includes a multicast communication type associated with the second set of one or more PMOs.

A method for wireless communication at a network entity is described. The method may include transmitting, in a first time slot, a DCI message indicating at least a second time slot for a UE to transmit feedback according to a codebook size and receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

An apparatus for wireless communication is described. The apparatus may include at least one memory and at least one processor coupled to the at least one memory. The at least one processor may be configured to transmit, in a first time slot, a DCI message indicating at least a second time slot for a UE to transmit feedback according to a codebook size and receive, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

Another apparatus for wireless communication is described. The apparatus may include means for transmitting, in a first time slot, a DCI message indicating at least a second time slot for a UE to transmit feedback according to a codebook size and means for receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

A non-transitory computer-readable medium storing code for wireless communication at a network entity is described. The code may include instructions executable by one or more processors to transmit, in a first time slot, a DCI message indicating at least a second time slot for a UE to transmit feedback according to a codebook size and receive, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

Some examples of the method, apparatuses, and non-transitory computer-readable medium described herein may further include operations, features, means, or instructions for transmitting a message that indicates a configuration of a set of downlink control resources in one or more component carriers, the set of downlink control resources including a first subset of downlink control resources associated with a first CORESET pool and a second subset of downlink control resources associated with a second CORESET pool, where the feedback may be received according to at least a first codebook having the first codebook size based on the quantity of PMOs included in the first set of one or more PMOs, where each PMO of the first set of one or more PMOs may be associated with the first CORESET pool, and where the first codebook generation characteristic includes a first index associated with the first CORESET pool.

In some examples of the method, apparatuses, and non-transitory computer-readable medium described herein, receiving the feedback may include operations, features, means, or instructions for receiving, via a same uplink resource in the second time slot, the feedback according to a combination of the first codebook size of the first codebook and a second codebook size of a second codebook, the second codebook size based on a second quantity of PMOs included in the second set of one or more PMOs, where each PMO of the second set of one or more PMOs may be associated with the second CORESET pool, and where the second codebook generation characteristic includes a second index associated with the second CORESET pool.

Some examples of the method, apparatuses, and non-transitory computer-readable medium described herein may further include operations, features, means, or instructions for receiving, via a second uplink resource, second feedback according to a second codebook having a second codebook size that may be based on a second quantity of PMOs included in the second set of one or more PMOs, where the second uplink resource may be different than a first uplink resource via which the feedback may be transmitted according to the first codebook having the first codebook size, and where each PMO of the second set of one or more PMOs may be associated with the second CORESET pool, the second codebook generation characteristic including a second index associated with the second CORESET pool.

Some examples of the method, apparatuses, and non-transitory computer-readable medium described herein may further include operations, features, means, or instructions for transmitting a message that indicates a configuration of a first codebook associated with a first priority and a second codebook associated with a second priority, where the feedback may be received according to at least the first codebook having the first codebook size based on the quantity of PMOs included in the first set of one or more PMOs, where each PMO of the first set of one or more PMOs may be associated with the first priority, and where the first codebook generation characteristic includes the first priority.

In some examples of the method, apparatuses, and non-transitory computer-readable medium described herein, receiving the feedback may include operations, features, means, or instructions for receiving, via a second uplink resource, second feedback according to the second codebook having a second codebook size that may be based on a second quantity of PMOs included in the second set of one or more PMOs and associated with the second priority, where the second uplink resource may be different than a first uplink resource via which the feedback may be transmitted according to the first codebook having the first codebook size, and where each PMO of the second set of one or more PMOs may be associated with the second priority, the second codebook generation characteristic including the second priority.

Some examples of the method, apparatuses, and non-transitory computer-readable medium described herein may further include operations, features, means, or instructions for transmitting, via the first set of one or more PMOs, a first set of one or more DCI messages, where the first set of one or more PMOs may be associated with the first priority based on each DCI message of the first set of one or more DCI messages being associated with a first format and including a priority field configured to indicate a priority of a transmission associated with the respective DCI message and transmitting, via the second set of one or more PMOs, a second set of one or more DCI messages, where the second set of one or more PMOs may be associated with the second priority based on each DCI message of the second set of one or more DCI messages being associated with the first format and including the priority field or being associated with a second format that does not include the priority field.

Some examples of the method, apparatuses, and non-transitory computer-readable medium described herein may further include operations, features, means, or instructions for transmitting a message that indicates a first type of codebook associated with the first codebook generation characteristic and a second type of codebook associated with the second codebook generation characteristic, the first type of codebook including a PMO-based codebook, and the second type of codebook including one of a semi-static codebook or a dynamic codebook, where the feedback may be received according to at least a first codebook associated with the first codebook size according to the first type of codebook and based on the quantity of PMOs included in the first set of one or more PMOs associated with the first codebook generation characteristic and a second codebook associated with a second codebook size according to the second type of codebook and either a quantity of physical downlink shared channel reception occasions or a quantity of downlink assignment indices transmitted via the set of multiple PMOs.

In some examples of the method, apparatuses, and non-transitory computer-readable medium described herein, receiving the feedback may include operations, features, means, or instructions for receiving the feedback via a same uplink resource in the second time slot according to a combination of the first codebook size associated with the first type of codebook and the second codebook size associated with the second type of codebook.

Some examples of the method, apparatuses, and non-transitory computer-readable medium described herein may further include operations, features, means, or instructions for receiving, via a second uplink resource, second feedback according to the second type of codebook having the second codebook size, where the second uplink resource may be different than a first uplink resource via which the feedback may be transmitted according to the first type of codebook having the first codebook size.

In some examples of the method, apparatuses, and non-transitory computer-readable medium described herein, the first codebook generation characteristic includes a unicast communication type associated with the first set of one or more PMOs and the second codebook generation characteristic includes a multicast communication type associated with the second set of one or more PMOs.

BRIEF DESCRIPTION OF THE DRAWINGS

FIGS. 16 through 21 show flowcharts illustrating methods that support PMO-based codebook generation according to varying codebook generation characteristics in accordance with one or more aspects of the present disclosure.

DETAILED DESCRIPTION

Figure 1:
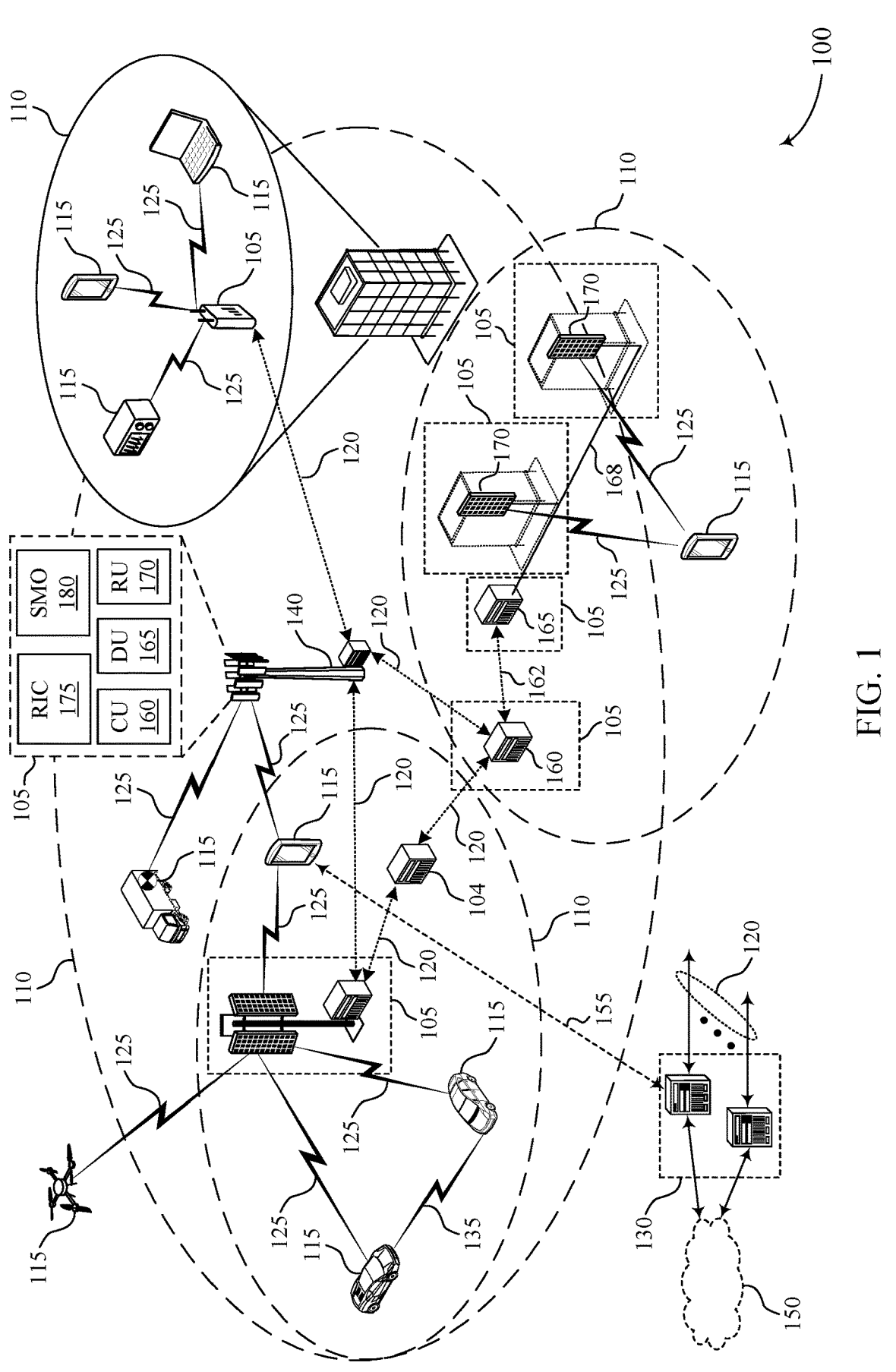
FIG. 1 shows an example of a wireless communications system that supports physical downlink control channel (PDCCH) monitoring occasion (PMO)-based codebook generation according to varying codebook generation characteristics in accordance with one or more aspects of the present disclosure.

In some wireless communications systems, a user equipment (UE) may transmit feedback in response to one or more received messages. For example, a UE may receive control signaling (e.g., downlink control information (DCI) or some other type of control signaling) that schedules a data transmission (e.g., via a physical downlink shared channel (PDSCH)), and the UE may transmit a feedback message (e.g., hybrid automatic repeat request (HARQ) acknowledgment (ACK) or negative acknowledgment (NACK)) to indicate whether the data transmission was decoded successfully or not. In some examples, feedback messages may be transmitted according to different codebook types. For example, a codebook may be based on multiple candidate physical downlink shared channel (PDSCH) occasions (e.g., a Type 1 codebook), based on a quantity of downlink assignment indicators (DAIs) monitored by the UE (e.g., a Type 2 codebook), or based on a quantity of physical downlink control channel (PDCCH) monitoring occasions (PMOs) that occur before a time slot (e.g., a time slot in which the UE is scheduled to transmit feedback).

In some cases, the UE may generate one or more codebooks based on one or more different characteristics. For example, the UE may receive DCI from one or more transmission reception points (TRPs) (e.g., multiple TRP (m-TRP) communications), and the UE may associate the DCI with a respective TRP of the one or more TRPs based on an index of a control resource set (CORESET). In some cases, the UE may generate a separate codebook for each CORESET. In some other cases, the UE may receive downlink transmissions associated with one or more priorities and may generate a separate codebook for each priority. The UE may transmit joint feedback (e.g., for the one or more TRPs, the one or more priorities, or one or more other characteristics) according to a codebook via a same resource. Additionally, or alternatively, the UE may transmit separate feedback (e.g., for the one or more TRPs, the one or more priorities, or one or more other characteristics) according to the one or more codebooks via separate resources.

Techniques, systems, and devices described herein may provide for a UE to generate a PMO-based codebook according to varying codebook generation characteristics. For example, the UE may generate the PMO-based codebook according to one or more priorities, one or more CORESET indices, one or more other codebook generation parameters, or any combination thereof associated with a set of PMOs. In some examples, the UE may monitor the set of PMOs and determine a first set of PMOs associated with a first codebook generation characteristic and a second set of PMOs associated with a second codebook generation characteristic. A PMO may be included in the first set of PMOs, the second set of PMOs, or both according to one or more codebook generation characteristics associated with the PMO.

In some examples, the UE may receive a message indicating a configuration of a set of downlink control resources, which may correspond to a CORESET. For example, the first codebook generation characteristic may correspond to an index associated with a set of downlink resources (e.g., a CORESET pool). The UE may monitor the PMOs and determine the first set of PMOs, the second set of PMOs, or both. For example, the UE may determine a PMO is in the first set of PMOs based on determining that the PMO is associated with a first CORESET pool. Or, the UE may determine a PMO is in the second set of PMOs based on determining that the PMO is associated with a second CORESET pool. Further, the UE may determine a PMO is in the first set of PMOs and the second set of PMOs based on determining that the PMO is associated with both the first CORESET pool and the second CORESET pool. The UE may generate a first PMO-based codebook and a second PMO-based codebook based on the first set of PMOs and the second set of PMOs, respectively. In some examples, the UE may transmit feedback according to the first PMO-based codebook and the second PMO-based codebook via separate resources. In some other cases, the UE may concatenate the first PMO-based codebook and the second PMO-based codebook and transmit feedback according to the concatenating via a same resource.

Additionally, or alternatively, the UE may receive a message indicating configurations for one or more codebooks associated with one or more priorities. In some examples, the UE may receive, via a PMO, signaling (e.g., DCI) indicating a respective priority of the PMO. The UE may generate PMO-based codebooks according to the associated priorities. For example, the second codebook generation characteristic may correspond to a transmission priority. The UE may generate a first PMO-based codebook based on a first set of PMOs associated with a first priority and a second PMO-based codebook based on a second set of PMOs associated with a second priority.

Aspects of the disclosure are initially described in the context of wireless communications systems. Aspects of the disclosure are also described in the context of slot diagrams and process flows. Aspects of the disclosure are further illustrated by and described with reference to apparatus diagrams, system diagrams, and flowcharts that relate to PMO-based codebook generation according to varying codebook generation characteristics.

FIG. 1 shows an example of a wireless communications system 100 that supports PMO-based codebook generation according to varying codebook generation characteristics in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support PMO-based codebook generation according to varying codebook generation characteristics as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, a UE 115 may support different codebook types for feedback transmissions. For example, the UE 115 may support one or more of Type 1 codebooks, Type 2 codebooks, and PMO-based codebooks, among other types of codebooks as described herein, where the UE 115 may transmit a feedback message (e.g., a HARQ-ACK message) according to a codebook and where a codebook may map one or more bits of the feedback message to one or more antenna ports or antennas of the UE 115.

In some examples, a Type 1 codebook may be determined using semi-static information. For example, a Type 1 codebook may be based on one or more candidate PDSCH occasions, where a PDSCH occasion may be one or more symbols in which the UE 115 may receive a PDSCH transmission. Specifically, a size of a Type 1 codebook in a slot n may be based on a quantity of candidate PDSCH occasions in a $K_1$ window, or time defined by a $K_1$ value, for each downlink component carrier. In an example, the UE 115 may determine a set of candidate PDSCH occasions on a per downlink serving cell basis. For example, the UE 115 may receive signaling configuring a set of slot timing offset values, or $K_1$ values, where each of the set of $K_1$ values may represent an offset between a candidate PDSCH occasion and transmission of a feedback message (e.g., a HARQ-ACK response). In some examples, the set of $K_1$ values may be indicated to the UE 115 by RRC signaling or may be a fixed set, and one value from the set of $K_1$ values may be indicated by DCI. In an example, the UE 115 may be configured with a set of $K_1$ values including $\{1, 2, 3, 4, 5, 6, 7, 8\}$ if DCI 1_0 is configured and DCI 1_1 is not configured for the serving cell. The UE 115 may receive a DCI indicating one or more $K_1$ values of the set of $K_1$ values. Additionally, or alternatively, if DCI format 1_1. DCI format 1_2, or both are configured for the serving cell, the set of $K_1$ values may be provided by a parameter dl-DataToUL-ACK. For example, the UE 115-a may receive a PUCCH configuration within RRC signaling indicating the set of $K_1$ values.

The UE 115 may consider one or more PDSCH candidates of the set of PDSCH candidates while determining the Type 1 codebook, where each PDSCH candidate may represent a PDSCH time domain resource allocation (TDRA) candidate. For example, each PDSCH TDRA candidate may correspond to a start and length indicator value (SLIV) within a slot. In some cases, the UE 115 may remove PDSCH TDRA candidates that overlap with semi-static uplink symbols (e.g., in TDD systems). The UE 115 may group the remaining TDRA candidates (e.g., TDRA rows) after removing the overlapping TDRA candidates such that a quantity (e.g., number) of groups is equal to a maximum quantity of non-overlapping SLIVs in the slot. In some cases, the UE 115 may refrain from grouping the remaining TDRA candidates. For example, if a maximum quantity of PDSCH transmissions that can be received in a slot is one, then there may be only one bit (one PDSCH occasion) per $K_1$ value. In some examples, if a PDSCH transmission is not scheduled (e.g., via DCI or other signaling) for a given candidate PDSCH occasion with HARQ-ACK in a slot n, a bit in a HARQ-ACK feedback message may be set to NACK.

The UE 115 and/or a network entity 105 in the wireless communications system 100 may determine a Type 2 codebook using dynamic information. For example, the UE 115 may determine a Type 2 codebook based on one or more PMOs and one or more DAIs received via DCI (e.g., within a DCI including grant for one or more PDSCH receptions). Specifically, a size of a Type 2 codebook in a slot n may be based on a quantity (e.g., number) of received DCIs indicating to transmit HARQ-ACK in the slot n. Additionally, or alternatively, the Type 2 codebook may be based on a quantity of missing DCIs based on missing DAI values detected by the UE 115. For example, the order of the one or more PMOs may be used to order received DAIs based on which PMO they are received on. In an example, the UE 115 may receive a first PDCCH DCI in a first PMO indicating a first DAI, and a second PDCCH DCI in a second PMO indicating a second DCI. The UE 115 may then order the first DAI before the second DAI based on receiving the first DAI within the first PMO. In some examples, the UE 115 may use the value of DAIs after ordering to detect holes corresponding to missing DCIs. For example, the first DAI may have a value of 1, and the second DAI may have a value of 3, and the UE 115 may determine that a DAI of a value of 2 is missing. In some examples, the UE 115 may insert a NACK in a Type 2 codebook corresponding to DAI holes.

A PMO-based codebook may represent a semi-static codebook (e.g., a HARQ-ACK codebook different than a Type 1 codebook) that is based on one or more PMOs based on configured search space sets. For example, a PMO-based codebook may be based on a search space configuration or a PMO configuration received in RRC. Specifically, the UE 115 may determine a size of a PMO-based codebook in a slot n based on a quantity (e.g., number) of PMOs in a set of slots $n-\{K'_{1,k}\}$, where $K'_1=\{K'_{1,0}, K'_{1,1}, \ldots\}$ may represent a set of possible slot offset values from DCI reception to HARQ-ACK transmission. In some examples, each place or location (e.g., bit) of a PMO-based codebook may correspond to one PMO. In some cases, similar to Type 1 codebook size calculation, the UE 115 may omit configured PMOs that overlap with semi-static uplink symbols (e.g., in TDD) when determining the size of a PMO-based codebook. Additionally, or alternatively, the UE 115 may consider PMOs that are configured for monitoring downlink DCI formats that have associated HARQ-ACK messages (e.g., DCI format 1_0/1_1/1_2). For example, if a search space set is configured for monitoring other DCI formats, the UE 115 may not consider the PMOs of that SS set for PMO-based codebooks.

In some examples, the UE 115 may receive a DCI in a first PMO, where the DCI may indicate to transmit feedback (e.g., HARQ-ACK feedback) in a slot n. In some cases, the DCI may schedule a PDSCH transmission, where a bit within the feedback (e.g., HARQ-ACK) may be set corresponding to a decoding result of the PDSCH. For example, a bit in a HARQ-ACK may be set to ACK if the corresponding PDSCH is successfully decoded, whereas the bit may be set to a NACK if the PDSCH is not successfully decoded. Additionally, or alternatively, the DCI may not schedule a PDSCH transmission. For example, the DCI may indicate a semi-persistent scheduling (SPS) release, a secondary cell (SCell) dormancy, a transmission configuration indicator (TCI) state change, among other indications. In some examples, the bit in a HARQ-ACK message may be set to ACK or NACK based on a successful or unsuccessful decoding, respectively of the DCI. In some examples, if no DCI is received in the first PMO, or if DCI received does not indicate to transmit HARQ-Ack in the slot n, then the bit may be set to NACK.

Techniques, systems, and devices described herein provide for a UE 115 to generate one or more PMO-based codebooks according to varying codebook generation characteristics. As described herein, the UE 115 may receive a DCI message in a first time slot indicating a second time slot for the UE 115 to transmit feedback according to a codebook size. The UE 115 may monitor a quantity of PMOs within a subset of time slots (e.g., before the second time slot). In some examples, the quantity of PMOs may include a first set of one or more PMOs associated with a first codebook generation characteristic and a second set of one or more PMOs associated with a second codebook generation characteristic. The UE 115 may transmit the feedback via the second time slot according to a first codebook size based on the monitoring. For example, the first codebook size may be based on a quantity of PMOs included in the first set of PMOs associated with the first codebook generation characteristics. In some examples, the first codebook generation characteristic and the second codebook generation characteristic may include an index associated with a CORESET pool, a priority, or the like.

Figure 2:
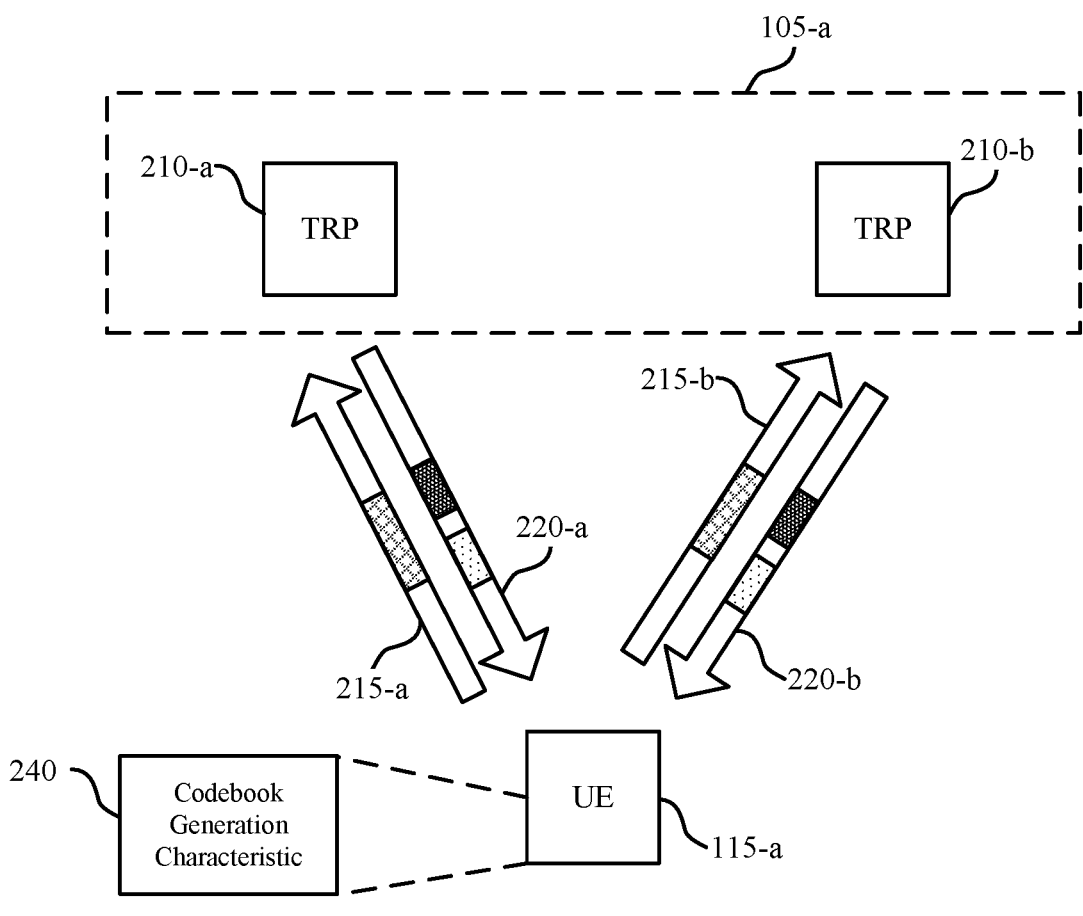
FIG. 2 shows an example of a wireless communications system that supports PMO-based codebook generation according to varying codebook generation characteristics in accordance with one or more aspects of the present disclosure.
Figure 2:
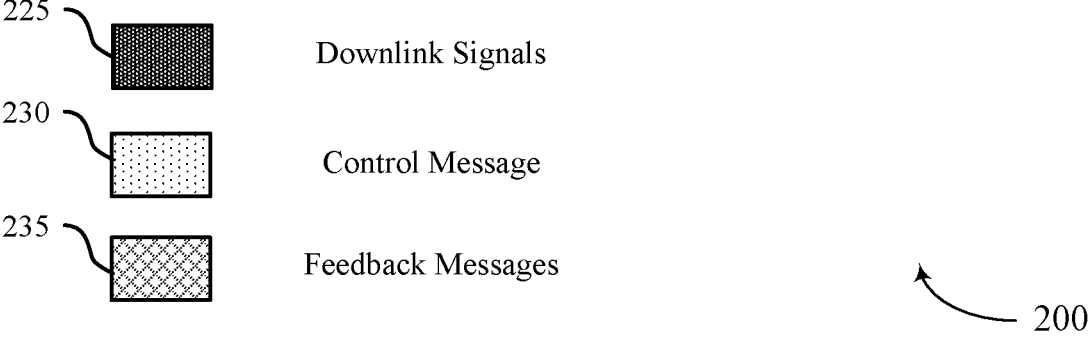

FIG. 2 shows an example of a wireless communications system 200 that supports PMO-based codebook generation according to varying codebook generation characteristics in accordance with one or more aspects of the present disclosure. The wireless communications system 200 may implement or be implemented by aspects of the wireless communications system 100. For example, the wireless communications system 200 may include a UE 115-a and a network entity 105-a, which may represent examples of a UE 115 and a network entity 105 as described with reference to FIG. 1. The network entity 105-a may include a TRP 210-a and a TRP 210-b. In some examples, the TRP 210-a and the TRP 210-b may be of the same network entity (e.g., the network entity 105-a) as illustrated by the example of FIG. 2. In some other cases, the TRP 210-a and the TRP 210-b may be of different network entities. The network entity 105-a may transmit or relay data or control signaling to the UE 115-a via one or more other access network transmission entities, which may be referred to as TRPs 210.

The UE 115-a may communicate with the TRPs 210-a and 210-b via respective uplink communication links 215 and downlink communication links 220. The TRP 210-a and the TRP 210-b may transmit downlink signals 225, control messages 230, or both via a downlink communications link 220-a and a downlink communications link 220-b, respectively. The UE 115-a may transmit feedback messages 235 to the TRP 210-a and the TRP 210-b via an uplink communications link 215-a and an uplink communications link 215-b, respectively, or the UE 115-a may transmit a joint feedback message (e.g., a single message) via an uplink communication link (e.g., a single communication link) to either the TRP 210-a or the TRP 210-b

In some cases, the UE 115-a may receive one or more DCI messages from the network entity 105-a via the TRP 210-a, the TRP 210-b, or both. For example, the UE 115-a may receive a first DCI via the TRP 210-a and a second DCI via the TRP 210-b (e.g., in a multi-DCI based multi-TRP scheme). In some examples, the first DCI transmitted via the TRP 210-a may schedule a first PDSCH transmission (e.g., transmitted via the TRP 210-a). Similarly, the second DCI transmitted via the TRP 210-b may schedule a second PDSCH transmission (e.g., transmitted via the TRP 210-b).

The UE 115-*a* may associate the first DCI and the second DCI with the TRP 210-*a* and the TRP 210-*b*, respectively, based on an index associated with a CORESET (e.g., a CORESETPoolIndex value of 0 or 1). For example, the UE 115-*a* may not identify the TRPs 210-*a* or 210-*b* without the index associated with the CORESET (e.g., the TRPs 210-*a* and 210-*b* may be transparent to the UE 115-*a*).

The UE 115-*a* may receive a message indicating a configuration of a set of downlink control resources (e.g., a CORESET). In some cases, the UE 115-*a* may receive one or more sets of downlink control resources (e.g., up to five CORESETs). In some examples, the UE 115-*a* may use the one or more sets of downlink control resources for feedback (e.g., HARQ-ACK feedback). For example, the UE 115-*a* may receive DCI in a quantity of CORESETs with associated index values (e.g., a CORESETPoolIndex value of 0 or 1).

The UE 115-*a* may associate the first DCI with the TRP 210-*a* based on a first index associated with the CORESET pool (e.g., a CORESETPoolIndex value of 0) and the second DCI with the TRP 210-*b* based on a second index associated with the CORESET pool (e.g., a CORESETPoolIndex value of 1). That is, the UE 115-*a* may identify the TRP 210-*a* and the TRP 210-*b* based on the associated index associated with the CORESET pool.

The UE 115-*a* may be enabled to receive the first DCI and the second DCI via the TRP 210-*a* and the TRP 210-*b*, respectively, based on being configured with one or more higher layer parameters. For example, the UE 115-*a* may be enabled for multi-DCI based multi-TRP PDSCH based on being configured with a parameter (e.g., PDCCH-Config). In some cases, the parameter may contain a quantity of index values (e.g., CORESETPoolIndex values) in configured CORESETs for the active BWP of a cell (e.g., a serving cell).

The UE 115-*a*, in some cases, may be configured to transmit feedback messages 235 for multi-DCI based multi-TRP. For example, as described in further detail elsewhere herein, including with reference to FIGS. 3A and 3B, a UE 115-*a* may transmit feedback messages 235 corresponding to one or more downlink signals 225 received from one or more TRPs (e.g., the TRP 210-*a* and the TRP 210-*b*) including joint feedback (i.e., on a same uplink resource) or separate feedback (i.e., on separate uplink resources).

Additionally, or alternatively, the UE 115-*a* may be configured to transmit feedback messages 235 for two or more priorities (e.g., a high priority and a low priority). For example, as described in FIG. 4, the UE 115-*a* may transmit multiple feedback messages 235 according to a first feedback codebook and a second feedback codebook, respectively. For example, the first feedback codebook may correspond to a first priority while the second feedback codebook may correspond to a second priority.

As described herein, the UE 115-*a* may generate one or more PMO-based codebooks according to one or more codebook generation characteristics 240. For example, the UE 115-*a* may generate one or more PMO-based codebooks based on DCI received via a first set of PMOs associated with a first codebook generation characteristic 240 and via a second set of PMOs associated with a second codebook generation characteristic 240. The DCI may be transmitted by the TRP 210-*a*, the TRP 210-*b*, or both. For example, the UE 115-*a* may generate a first PMO-based codebook according to an association between DCI received via the first set of PMOs and a first index associated with a first CORESET pool or a first transmission priority, or some other type of codebook generation characteristic 240. Additionally, or alternatively, the UE 115-*a* may generate a second PMO-based codebook according to an association between the DCI received via the second set of PMOs and a second index associated with a second CORESET pool or a second transmission priority, or some other type of codebook generation characteristic 240. The UE 115-*a* may transmit feedback messages 235 according to the one or more PMO-based codebooks. The codebook generation characteristics 240 may include, one or more CORESET pools, one or more transmission priorities, one or more types of unicast or multicast communications, one or more other characteristics, or any combination thereof.

Figure 3A:
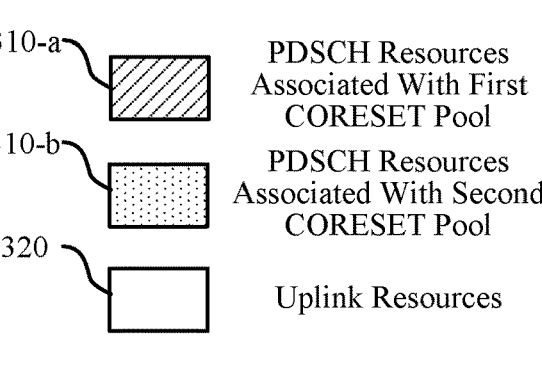
FIGS. 3A through 6 show examples of feedback timing diagrams that support PMO-based codebook generation according to varying codebook generation characteristics in accordance with one or more aspects of the present disclosure.
Figure 3A:
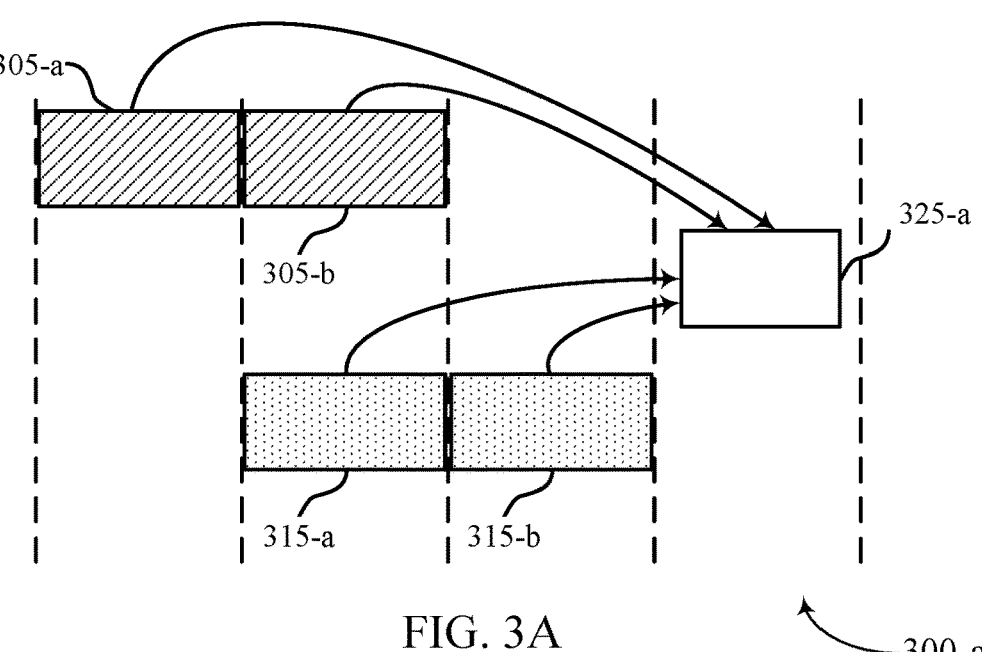
Figure 3B:
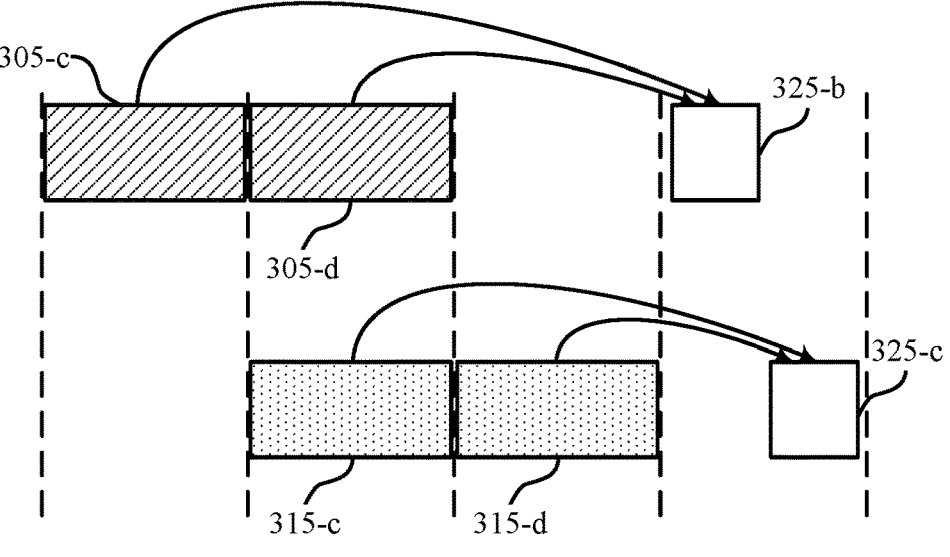

FIGS. 3A and 3B show examples of feedback timing diagrams 300-*a* and 300-*b*, respectively, that support PMO-based codebook generation according to varying codebook generation characteristics in accordance with one or more aspects of the present disclosure. The feedback timing diagrams 300-*a* and 300-*b* may implement or be implemented by aspects of the wireless communications system 100, the wireless communications system 200, or both. For example, the feedback timing diagrams 300-*a* and 300-*b* may be implemented by a UE 115 and a network entity 105 as described with reference to FIGS. 1 and 2.

As illustrated by the feedback timing diagram 300-*a* in FIG. 3A, a wireless device may, in some examples, transmit joint feedback. For example, a network entity may configure a UE to transmit the joint feedback (e.g., the network entity may set a feedback mode of the UE to joint). That is, the UE may transmit feedback 325-*a* responsive to messages 305 and messages 315 on a same uplink resource 320 (e.g., PUCCH resource). In some cases, the joint feedback may be transmitted based on an ideal backhaul (e.g., between two or more TRPs).

The UE may receive one or more downlink messages (e.g., PDSCH messages) associated with a first TRP (e.g., TRP0) and a second TRP (e.g., TRP1). For example, the UE may receive a message 305-*a* and a message 305-*b* via the TRP and a message 315-*a* and a message 315-*b* via the TRP. In some cases, the downlink messages of the first TRP may be associated with an index associated with a CORESET pool (e.g., a CORESETPoolIndex value of 0 or 1) different from an index associated with a CORESET pool for the downlink messages of the second TRP.

In some cases, the UE may identify that the message 305-*a* and the message 305-*b* are associated with the first TRP and the message 315-*a* and the message 315-*b* are associated with the second TRP based on a resource on which the messages are received. For example, the UE may receive the message 305-*a* and the message 305-*b* via PDSCH resources associated with a first CORESET pool 310-*a*. Further, the UE may receive the message 315-*a* and the message 315-*b* via PDSCH resources associated with a second resource pool 310-*b*.

In some cases, the UE may transmit joint feedback according to a semi-static codebook (e.g., a Type 1 codebook). For example, the UE may consider PDSCH occasions (e.g., sets of PDSCH resources 310) for a respective index associated with a CORESET pool. In some other cases, the UE may transmit joint feedback according to a dynamic codebook (e.g., a Type 2 codebook). For example, the UE may implement joint DAI counting for DAIs associated with both CORESET pools. In some cases, PMOs may be defined across multiple component carriers and across respective indices associated with CORESET pools.

If a component carrier is configured to support multi-DCI, the component carrier may appear in a first set of component carriers (e.g., S0) associated with PDSCH resources associated with the first CORESET pool 310-a and in a second set of component carriers (e.g., S1) associated with PDSCH resources associated with the second CORESET pool 310-b. For example, PDSCHs that are scheduled by different TRPs may be overlapping in time in a same component carrier. In such cases, the UE may count the component carrier two times (e.g., per CORESETPoolIndex value). The UE may count the component carrier in the first set of component carriers based on an index associated with a first CORESET of the component carrier (e.g., an index value of 0) or based on the component carrier not including an index associated with the CORESET of the component carrier. Further, the UE may count the component carrier in the second set of component carriers based on an index associated with a second CORESET of the component carrier (e.g., an index value of 1). One or more component carriers may be included in the first set of component carriers and the second set of component carriers (e.g., counted two times). In such cases, the UE may generate a first codebook for the first set of component carriers and a second codebook for the second set of component carriers. In some examples, the first codebook, the second codebook, or both, may be semi-static codebooks (e.g., Type 1 codebooks). The UE may concatenate the first codebook and the second codebook and transmit joint feedback 325-a (e.g., on the uplink resource 320) based on the concatenating.

Techniques, systems, and devices described herein provide for the UE to transmit the joint feedback 325-a according to a PMO-based codebook. For example, the UE may generate a first PMO-based codebook according to an association between the messages 305-a and 305-b and a first index associated with a first CORESET pool. Additionally, or alternatively, the UE may generate a second PMO-based codebook according to an association between the messages 315-a and 315-b and a second index associated with a second CORESET pool. In some examples, the UE may concatenate the first PMO-based codebook and the second PMO-based codebook and transmit joint feedback (e.g., on the uplink resource 320) based on the concatenating, as described in further detail elsewhere herein, including with reference to FIG. 5.

As illustrated by the feedback timing diagram 300-b in FIG. 3B, a wireless device may, in some examples, transmit separate feedback. For example, a network entity may configure a UE to transmit the separate feedback (e.g., the network entity may set a feedback mode of the UE to separate). That is, the UE may transmit feedback 325-b and feedback 325-c on separate uplink resources 320. In some cases, the separate feedback may be transmitted based on a non-ideal backhaul (e.g., between two or more TRPs).

The UE may receive one or more downlink messages (e.g., PDSCH messages) associated with a first TRP and a second TRP. For example, the UE may receive a message 305-c and a message 305-d via the first TRP and a message 315-c and a message 315-d via the second TRP. In some cases, the one or more downlink messages for the first TRP may be associated with a different index associated with a CORESET pool than the one or more downlink messages for the second TRP.

In some cases, the UE may identify that the message 305-c and the message 305-d are associated with the first TRP and the message 315-c and the message 315-d are associated with the second TRP based on a resource on which the messages are received. For example, the UE may receive the message 305-c and the message 305-d via PDSCH resources associated with a first CORESET pool 310-a. Further, the UE may receive the message 315-c and the message 315-d via PDSCH resources associated with a second resource pool 310-b.

In some cases, the UE may transmit separate feedback for the first TRP and the second TRP. For example, the UE may transmit the feedback 325-b for the messages 305-c and 305-d and the feedback 325-c for the messages 315-c and 315-d via different uplink resources 320.

In some cases, the UE may transmit the feedback 325-b, the feedback 325-c, or both according to a semi-static codebook (e.g., a Type 1 codebook). For example, the UE may consider PDSCH occasions for a respective index associated with a CORESET pool. In some other cases, the UE may transmit the feedback 325-b, the feedback 325-c, or both according to a dynamic codebook (e.g., a Type 2 codebook). For example, the UE may implement separate DAI counting. That is, the UE may count DAI for a respective index associated with a CORESET pool.

In some examples, the UE may transmit the feedback 325-b, the feedback 325-c, or both via separate time resources. For example, the network entity may ensure the feedback 325-b, the feedback 325-c, or both transmitted via two or more PUCCH messages are TDMed via semi-static coordination.

As described herein, the UE may transmit the feedback 325-b, the feedback 325-c, or both according to a PMO-based codebook. For example, the UE may generate a first PMO-based codebook according to an association between the messages 305-c and 305-d and a first index associated with a first CORESET pool. Additionally, or alternatively, the UE may generate a second PMO-based codebook according to an association between the messages 315-c and 315-c and a second index associated with a second CORESET pool. The UE may transmit separate feedback via different uplink resources 320 according to the first PMO-based codebook and the second PMO-based codebook, respectively.

Figure 4:
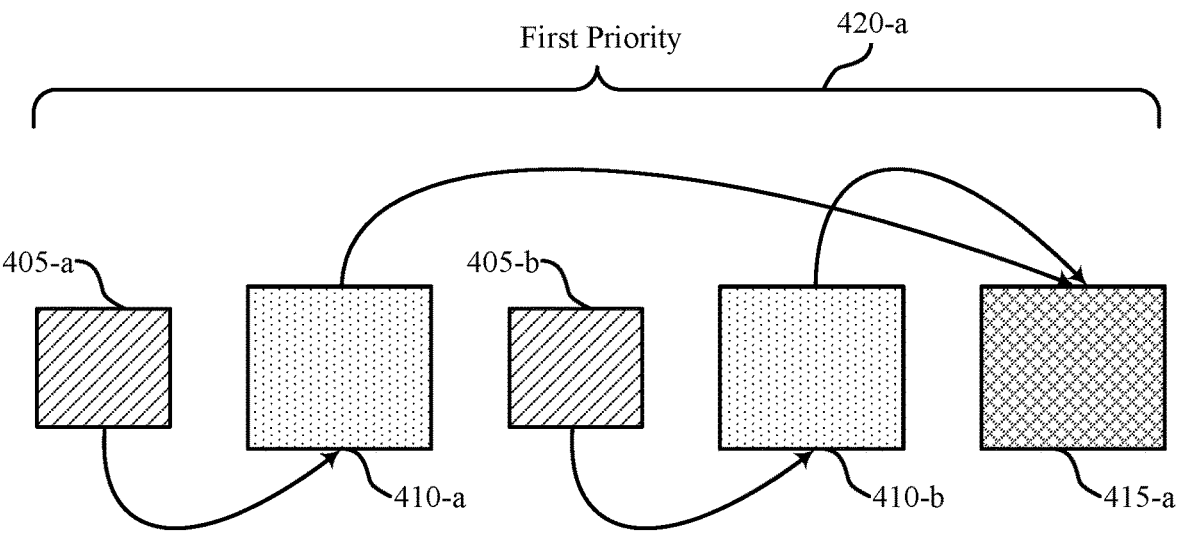
Figure 4:
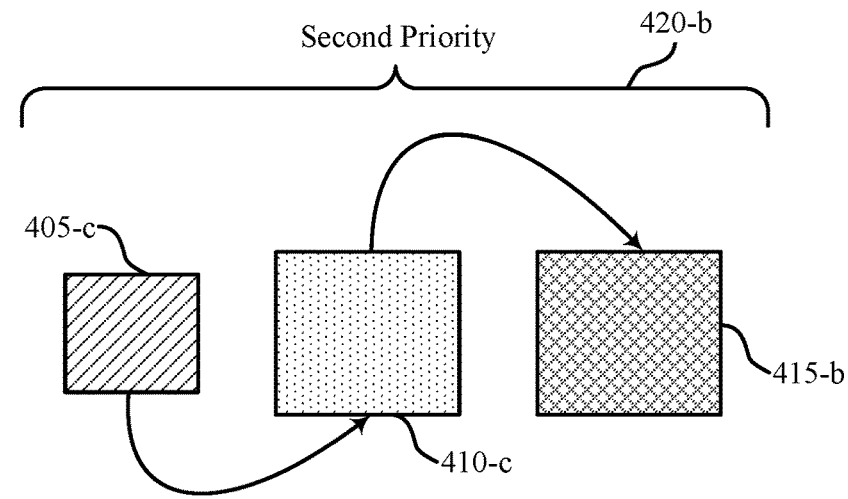
Figure 4:
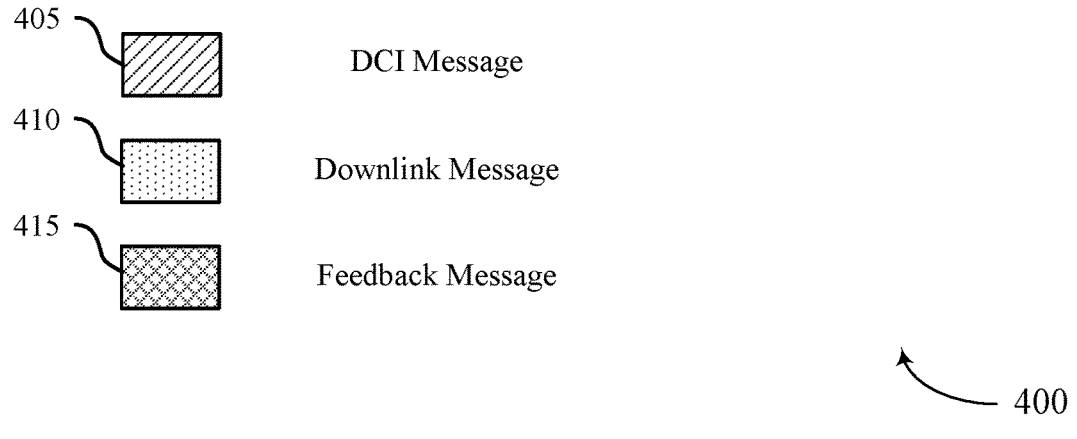

FIG. 4 shows an example of a feedback timing diagram 400 that supports PMO-based codebook generation according to varying codebook generation characteristics in accordance with one or more aspects of the present disclosure. The feedback timing diagram 400 may implement or be implemented by aspects of the wireless communications system 100, the wireless communications system 200, or both. For example, the feedback timing diagram 400 may be implemented by a UE 115 and a network entity 105 as described with reference to FIG. 1.

A network entity may configure a UE with one or more codebooks (e.g., HARQ-ACK codebooks). For example, the network entity may configure the UE with up to two codebooks via RRC messages (e.g., the RRC messages including a parameter pdsch-HARQ-ACK-CodebookList). In some cases, the network entity may configure the UE with two codebooks corresponding to two priorities. For example, the network entity may configure the UE with a first codebook corresponding to a first priority (e.g., a low priority) and a second codebook corresponding to a second priority (e.g., a high priority).

In some examples, the first codebook may correspond to a first codebook type while the second codebook may correspond to a second codebook type. For example, the first codebook may be a semi-static codebook (e.g., a Type 1 codebook) while the second codebook may be a dynamic codebook (e.g., a Type 2 codebook). In some cases, the first codebook type and the second codebook type may be the same (e.g., both a Type 1 codebook, Type 2 codebook, or some other codebook type).

As illustrated by the example of FIG. 4, a wireless device may receive one or more messages associated with one or more priorities. For example, a UE may receive a DCI message 405-a and a DCI message 405-b associated with a first priority 420-a (e.g., a low priority, Priority 0) as well as a DCI message 405-c associated with a second priority 420-b (e.g., a high priority, Priority 1). The DCI messages 405 may schedule a downlink message according to the respective priority and may indicate one or more PUCCH resources for the UE to use for transmission of feedback messages responsive to the downlink message.

The DCI messages 405 may include a priority indicator field that is configured to indicate a priority associated with a corresponding downlink message 410. In some cases, the priority indicator field may indicate a codebook type to be used for reporting the feedback (e.g., HARQ-ACK) corresponding to respective downlink messages 410 (e.g., PDSCH messages) scheduled by the DCI messages 405.

For example, the DCI messages 405-a and 405-b may include an indication of the first priority 420-a and first codebook type to be used for reporting feedback (e.g., reporting a feedback message 415-a) corresponding to downlink messages 410-a and 410-b, respectively, which may be scheduled by the DCI messages 405-a and 405-b. Additionally, or alternatively, the DCI message 405-c may include an indication of the second priority 420-b and a second codebook type to be used for reporting feedback (e.g., reporting a feedback message 415-b) corresponding to a downlink message 410-c, which may be scheduled by the DCI message 405-c. In such cases, the first codebook type and the second codebook type may be the same or different.

In some cases, a priority field may not be configured for a DCI, or a DCI format that does not support the priority field (e.g., DCI format 1_0) may be used, or the like. In such cases, the UE may assume that the corresponding downlink message 410 is associated with a lower priority (e.g., the first priority 420-a) based on the priority not being indicated.

In some examples, uplink resources used for feedback (e.g., the feedback message 415-a, the feedback message 415-b, or both) may be configured separately (e.g., for the first priority 420-a and the second priority 420-b). For example, an RRC message may configure a first set of uplink resources (e.g., a list of PUCCH resources) for the first codebook and a second set of uplink resources for the second codebook. In some cases, the indication of the first priority 420-a, the indication of the second priority 420-b, or both included in the DCI messages 405 may indicate an uplink resource (e.g., PUCCH resource) of the corresponding set of uplink resources. For example, the indication of the first priority 420-a may include an indication of a first uplink resource of the first set of uplink resources while the indication of the second priority 420-b may include an indication of a second uplink resource of the second set of uplink resources. That is, the UE may transmit the feedback message 415-a via the first uplink resource and the feedback message 415-b via the second uplink resource based on the indications.

In some cases, the UE may transmit first feedback associated with the first priority 420-a in the feedback message 415-a and second feedback associated with the second priority 420-b in the feedback message 415-b. For example, the UE may transmit the first feedback according to the first codebook associated with the first priority 420-a and the first codebook type and the second feedback according to the second codebook associated with the second priority 420-b and the second codebook type.

In some cases, the first uplink resource may overlap with the second uplink resource. In such cases, the UE may drop feedback associated with the lower priority. For example, if the uplink resources for the first priority 420-a overlap in time and/or frequency with the uplink resources for the second priority 420-b, the UE may drop feedback associated with the first priority 420-a based on the first priority 420-a being lower than the second priority 420-b.

Techniques, systems, and devices described herein provide for the UE to transmit the feedback message 415-a, the feedback message 415-b, or both according to a PMO-based codebook. For example, the UE may generate a first PMO-based codebook according to a first set of PMOs associated with a first priority indicated in the DCI messages 405. Additionally, or alternatively, the UE may generate a second PMO-based codebook according to a second set of PMOs associated with a second priority indicated in the DCI messages 405. The UE may transmit separate feedback (e.g., the feedback message 415-a and the feedback message 415-b) via separate uplink resources according to the first PMO-based codebook and the second PMO-based codebook, respectively. Additionally, or alternatively, the UE may transmit joint feedback via a same uplink resource. Techniques for PMO-based codebook generation based on varying transmission priorities are described in further detail elsewhere herein, including with reference to FIG. 6.

Figure 5:
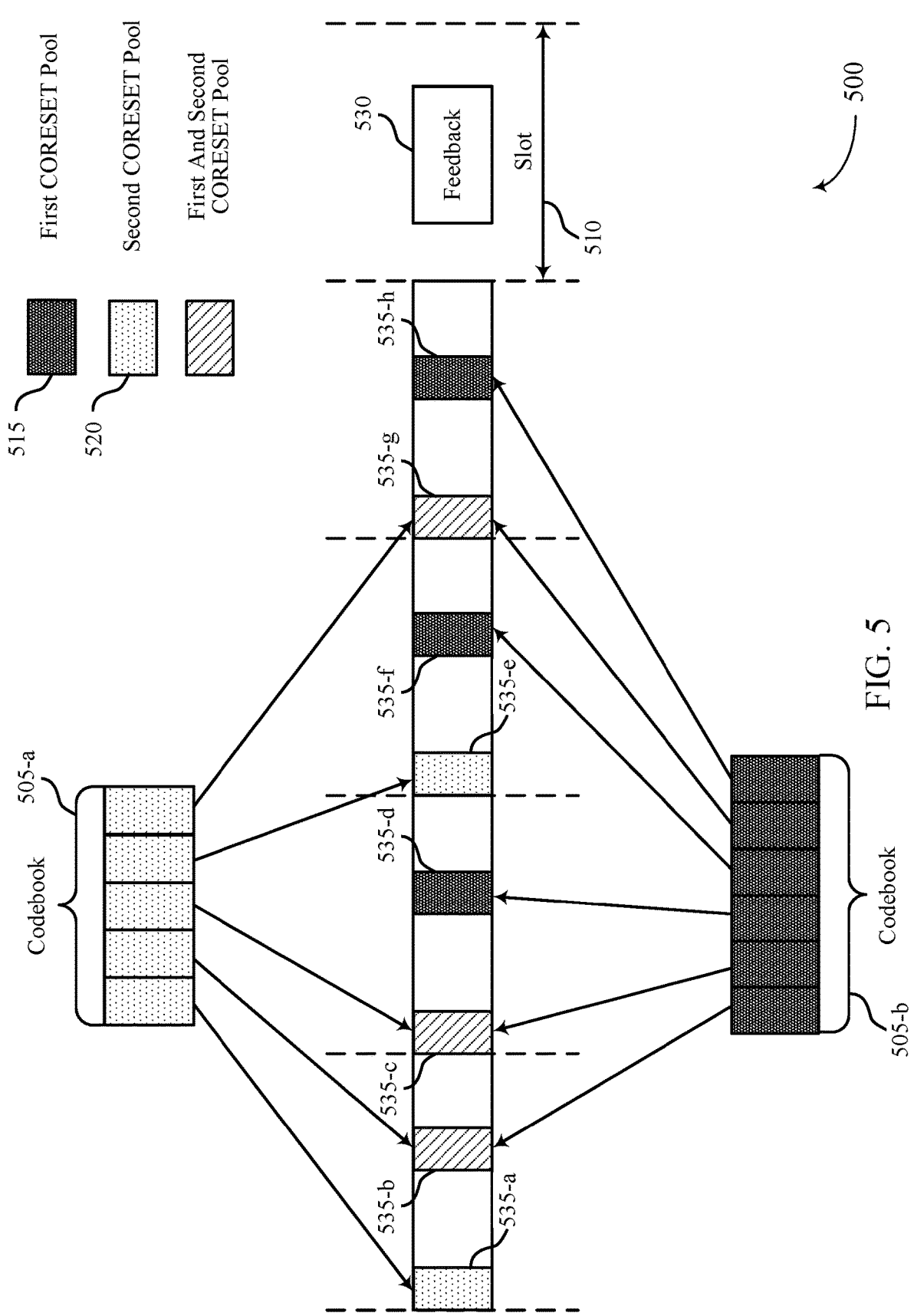

FIG. 5 shows an example of a feedback timing diagram 500 that supports PMO-based codebook generation according to varying codebook generation characteristics in accordance with one or more aspects of the present disclosure. The feedback timing diagram 500 may implement or be implemented by aspects of the wireless communications system 100, the wireless communications system 200, or both. For example, the feedback timing diagram 500 may be implemented by a UE 115 and a network entity 105 as described with reference to FIG. 1. In this example, a network entity may configure a UE to generate two or more codebooks, where each codebook may be associated with an index of a CORESET pool.

As described herein, a wireless device may transmit feedback 530 in a slot 510 (e.g., a slot n) according to a first codebook 505-a, a second codebook 505-b, or both. For example, a network entity may configure a UE to generate a PMO-based codebook and with two or more index values associated with CORESET pools in one or more component carriers. The first codebook 505-a, the second codebook 505-b, or both may be PMO-based codebooks.

As described in further detail elsewhere herein, including with reference to FIG. 1, if the UE is configured to generate a PMO-based codebook, the UE may determine a size of a PMO-based codebook in the slot 510 (e.g., slot n) based on a quantity (e.g., number) of PMOs in a set of slots $n-\{K'_1\}$, where $K'_1=\{1, 2, 3, 4\}$ may represent a set of possible slot offset values from DCI reception to transmission of feedback 530 in the slot 510.

The UE may monitor one or more PMOs 535 and determine whether each PMO 535 is associated with a first set of PMOs 535 for generating the first codebook 505-a or a second set of PMOs 535 for generating the second codebook 505-b, or both based on a CORESET pool associated with each PMO 535. For example, the UE may determine an index value (e.g., a coresetPoolIndex value) associated with each PMO. Each PMO 535 may be associated with a first CORESET pool 515, a second CORESET pool 520, or both the first CORESET pool 515 and second CORESET pool 520, as shown by the shading in FIG. 5.

For example, a PMO 535-*d*, a PMO 535-*f*, and a PMO 535-*h* may each be associated with the first CORESET pool 515. That is, an index (e.g., an index value of 0) associated with the first CORESET pool 515 may indicate that the PMO 535-*d*, the PMO 535-*f*, and the PMO 535-*h* are associated with the first CORESET pool 515. Accordingly, the PMO 535-*d*, the PMO 535-*f*, and the PMO 535-*h* may be included in the first set of PMOs 535 for generation of the first codebook 505-*a*.

Additionally, or alternatively, a PMO 535-*a* and a PMO 535-*e* may each be associated with the second CORESET pool 520. That is, an index (e.g., an index value of 1) associated with the second CORESET pool 520 may indicate that the PMO 535-*a* and the PMO 535-*e* are associated with the second CORESET pool 520. Accordingly, the PMO 535-*a* and the PMO 535-*e* may be included in the second set of PMOs 535 for generation of the second codebook 505-*b*.

Further, a PMO 535-*b*, a PMO 535-*c*, and a PMO 535-*g* may each be associated with both the first CORESET pool 515 and the second CORESET pool 520. That is, each of the PMOs 535-*b*, 535-*c*, and 535-*g* may be associated with two index values (e.g., an index value of both 0 and 1) of both the first CORESET pool 515 and the second CORESET pool 520. As such, the PMO 535-*b*, the PMO 535-*c*, and the PMO 535-*g* may be considered (e.g., separately) for the first codebook 505-*a* and the second codebook 505-*b*. That is, the PMO 535-*b*, the PMO 535-*c*, and the PMO 535-*g* may each be included in the first set of PMOs 535 for generation of the first codebook 505-*a* and the second set of PMOs 535 for generation of the second codebook 505-*b*. To determine association between each PMO and one or two CORESET pool index values (e.g., 0, 1, or both 0 and 1), the UE may consider the CORESET(s) configurations or the search space set(s) configurations that are associated with that PMO.

The UE may generate the first codebook 505-*a* and the second codebook 505-*b* separately. For example, the UE may generate the first codebook 505-*a* based on the first set of PMOs associated with the first CORESET pool 515, and the UE may generate the second codebook 505-*b* based on the second set of PMOs associated with the second CORESET pool 520. The UE may transmit the feedback 530 jointly or separately.

If the UE transmits joint feedback 530, the UE may concatenate the first codebook 505-*a* and the second codebook 505-*b* and transmit the joint feedback 530 in the slot 510 based on the concatenating. In some examples, the UE may transmit the joint feedback 530 via a same uplink resource (e.g., a PUCCH resource). If the UE transmits separate feedback, the UE may transmit first feedback according to the first codebook 505-*a* and second feedback according to the second codebook 505-*b*. In some examples, the UE may transmit the first feedback via a first uplink resource and the second feedback via a second uplink resource where the first uplink resource is different than the second uplink resource. The first and second uplink resources may both be in the slot 510 or in different slots. The network entity may, in some examples, transmit control signaling to configure the UE to perform joint or separate feedback transmissions.

In some examples, the network entity may configure the UE with one or more codebook types each associated with a respective CORESET pool. For example, the network entity may configure the UE with the first codebook 505-*a* and the second codebook 505-*b*, where the first codebook 505-*a* may be a PMO-based codebook and the second codebook 505-*b* may be a non-PMO-based codebook (e.g., a Type 1 codebook, a Type 2 codebook, or some other type of codebook). In such examples, the UE may consider a set of PMOs associated with a CORESET pool (e.g., a CORESET pool index value of 0) for the first codebook 505-*a* (e.g., the PMO-based codebook). That is, the UE may not consider PMOs associated with a CORESET pool index value of 1 for the first codebook 505-*a*. the UE may generate the second codebook 505-*b* according to another codebook type as configured by the network entity (e.g., a Type 1 codebook, a Type 2 codebook, or some other codebook type). For example, the UE may generate the second codebook 505-*b* based on a quantity of PDSCH reception occasions (e.g., Type 1) or a quantity of DAIs monitored by the UE via the PMOs 535 (e.g., Type 2).

The UE described herein may thereby generate one or more PMO-based codebooks based on different CORESET pools. The UE may group PMOs 535 into one or more sets or groups based on the CORESET pool indexes associated with the PMOs 535, and the UE may generate the codebooks 505 based on the sets of PMOs 535. In this example, the CORESET pool indexes may represent an example of a codebook generation characteristic. By grouping PMOs 535 based on the CORESET pool indexes, the UE may support PMO-based codebook generation during multi-DCI-based mTRP communications, which may improve communication reliability and throughput, among other possibilities.

Figure 6:
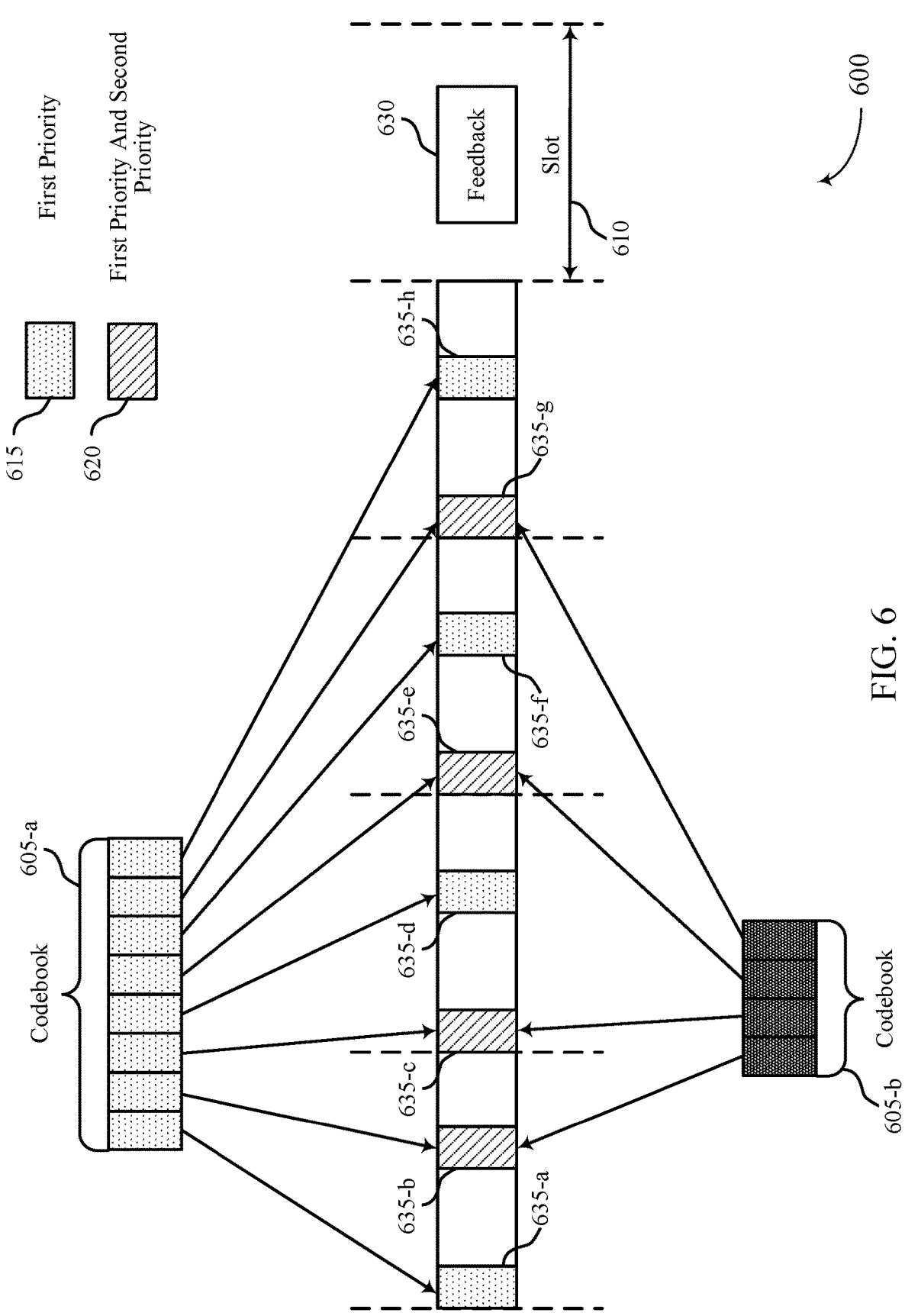

FIG. 6 shows an example of a feedback timing diagram 600 that supports PMO-based codebook generation according to varying codebook generation characteristics in accordance with one or more aspects of the present disclosure. The feedback timing diagram 600 may implement or be implemented by aspects of the wireless communications system 100, the wireless communications system 200, or both. For example, the feedback timing diagram 600 may be implemented by a UE 115 and a network entity 105 as described with reference to FIG. 1. In this example, a network entity may configure a UE to generate two or more codebooks, where each codebook may be associated with a different priority.

As described herein, a wireless device may transmit feedback 630 in a slot 610 (e.g., a slot n) according to a first codebook 605-*a*, a second codebook 605-*b*, or both. For example, a network entity may configure a UE to generate two or more PMO-based codebooks corresponding to two or more priorities.

As described in further detail elsewhere herein, including with reference to FIG. 1, if the UE is configured to generate a PMO-based codebook, the UE may determine a size of a PMO-based codebook in the slot 610 (e.g., a slot n) based on a quantity (e.g., number) of PMOs in a set of slots $n-\{K'_1\}$, where $K'_1=\{1, 2, 3, 4\}$ may represent a set of possible slot offset values from DCI reception to transmission of feedback 630 in the slot 610.

The UE may monitor one or more PMOs 635 and determine whether each PMO 635 is associated with a first set of PMOs 635 for generating the first codebook 605-*a* or a second set of PMOs 635 for generating the second codebook 605-*b*, or both based on a priority associated with each PMO 635. The first set of PMOs may include PMOs associated with DCI formats not including a priority indicator field (e.g., a DCI format 1_0). For example, the UE may (e.g., by default) associate the PMO without a priority indicator field with a first priority 615 (e.g., a lowest priority). That is, the PMO may only be associated with one of the two or more priorities. For example, a PMO 635-*a*, a PMO 635-*d*, a PMO 635-*f*, and a PMO 635-*h* may each be associated with a respective DCI having a DCI format not including a priority indicator field such that the PMO 635-*a*, the PMO 635-*d*, the PMO 635-*f*, and the PMO 635-*h* are associated with the first priority 615. Accordingly, the PMO 635-*a*, the PMO 635-*d*, the PMO 635-*f*, and the PMO 635-*h* may be included in the first set of PMOs for generation of the first codebook 605-*a*.

In some examples, the UE may determine a second set of PMOs 635. The second set of PMOs 635 may include PMOs 635 associated with a DCI format including a priority indicator field (e.g., DCI formats 1_1/1_2) which may be associated with a first priority and second priority 620. For example, the UE may monitor a DCI message and identify the DCI format including a priority indicator field and consider the PMO to be associated with both the first priority 615 and a second priority, where the priority indicator field may indicate the first priority or the second priority 620.

For example, a PMO 635-*b*, a PMO 635-*c*, a PMO 635-*e*, and a PMO 635-*g* may each be associated with a respective DCI having a DCI format including a priority indicator field such that the PMO 635-*b*, the PMO 635-*c*, the PMO 635-*e*, and the PMO 635-*g* are associated with the first priority and second priority 620. Accordingly, the PMO 635-*b*, the PMO 635-*c*, the PMO 635-*e*, and the PMO 635-*g* may be included in the first set and second set of PMOs 635 for generation of the first codebook 605-*a* and the second codebook 605-*b*, respectively. Although not illustrated in FIG. 6, it is to be understood that one or more PMOs 635 may be associated with the second priority and not the first priority 615. For example, if a DCI received via a PMO indicates the second priority or includes a field configured to indicate the second priority, the UE may include the PMO 635 in the second set of PMOs 635.

The UE may generate the first codebook 605-*a* and the second codebook 605-*b* separately. For example, the UE may generate the first codebook 605-*a* based on the first set of PMOs 635 associated with the first priority 615, the first priority and second priority 620, or both, and the UE may generate the second codebook 605-*b* based on the second set of PMOs 635 associated with the first priority and second priority 620.

If the UE transmits joint feedback 630, the UE may concatenate the first codebook 605-*a* and the second codebook 605-*b* and transmit the joint feedback 630 in the slot 610 based on the concatenating. In some examples, the UE may transmit the joint feedback 630 via a same uplink resources (e.g., a PUCCH resource).

If the UE transmits separate feedback, the UE may transmit first feedback according to the first codebook 605-*a* and second feedback according to the second codebook 605-*b*. In some examples, the UE may transmit the first feedback via a first uplink resource and the second feedback via a second uplink resource where the first uplink resource is different than the second uplink resource. The first and second uplink resources may both be in the slot 610 or in different slots. The network entity may, in some examples, transmit control signaling to configure the UE to perform joint or separate feedback transmissions.

In some examples, the network entity may configure the UE with a PMO-based codebook configured for a priority (e.g., only one priority). In such cases, the first codebook 605-*a* may be a PMO-based codebook generated based on PMOs associated with the first priority 615. Additionally, the second codebook 605-*b* may be a non-PMO-based codebook (e.g., a Type 1 codebook, a Type 2 codebook, or some other codebook type). The UE described herein may thereby generate one or more PMO-based codebooks based on different priorities. The UE may group PMOs 635 into one or more sets or groups based on the priorities associated with the PMOs 635, and the UE may generate the codebooks 605 based on the sets of PMOs 635. In this example, the priorities may represent an example of a codebook generation characteristic. By grouping PMOs 635 based on the priorities, the UE may support PMO-based codebook generation for multiple priorities, which may improve communication reliability and throughput, among other possibilities.

Figure 7:
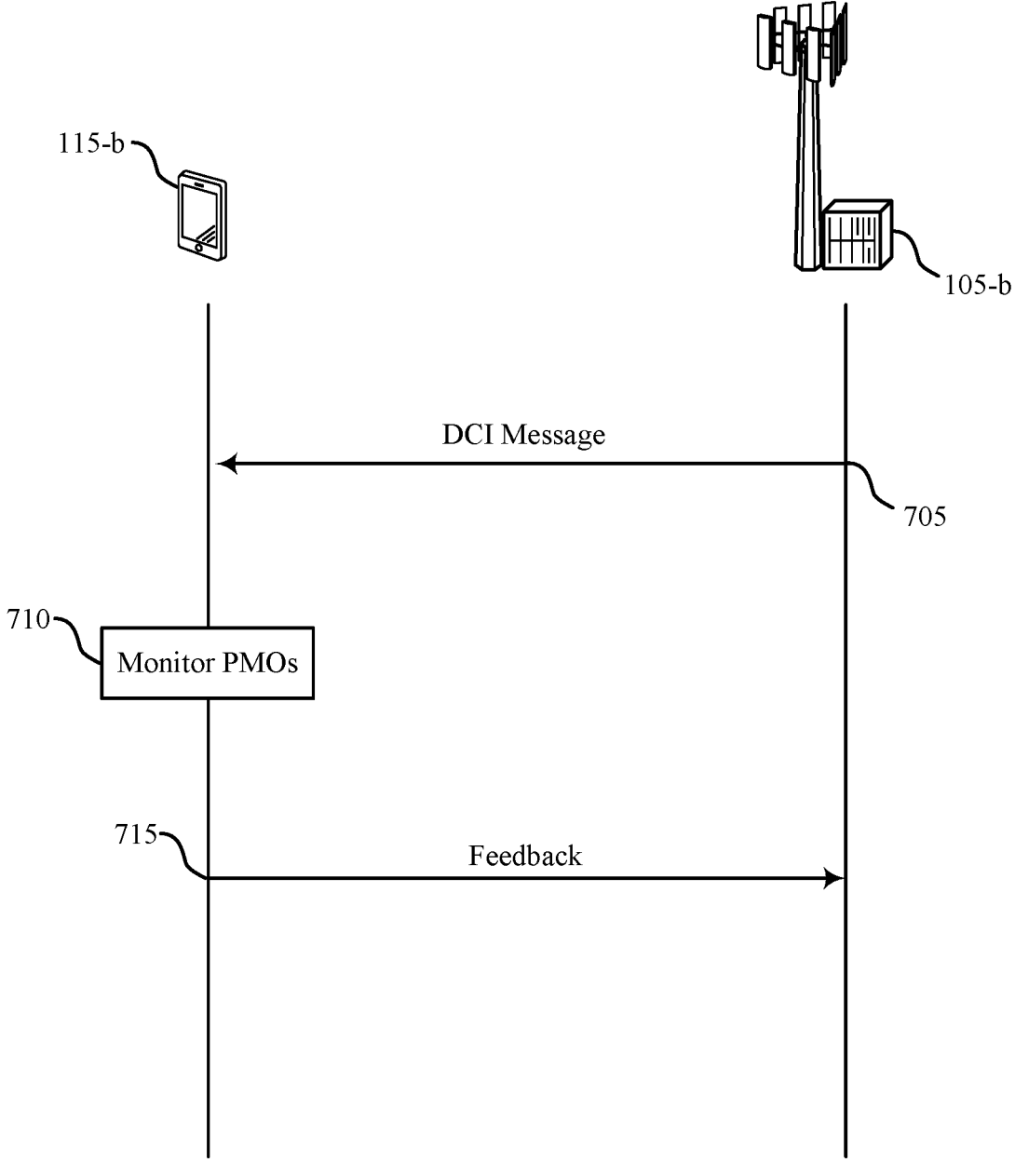
FIG. 7 shows an example of a process flow that supports PMO-based codebook generation according to varying codebook generation characteristics in accordance with one or more aspects of the present disclosure.

FIG. 7 shows an example of a process flow 700 that supports PMO-based codebook generation according to varying codebook generation characteristics in accordance with one or more aspects of the present disclosure. In some examples, the process flow 700 may implement or be implemented by aspects of the wireless communications system 100, the wireless communications system 200, the feedback timing diagrams 300, 400, 500, and 600, as described with reference to FIGS. 1-6. For example, the process flow 700 may include a UE 115-*b* and a network entity 105-*b* which may be examples of corresponding devices as described with reference to FIGS. 1-3. Alternative examples of the following may be implemented, where some steps are performed in a different order than described or are not performed at all. In some cases, steps may include additional features not mentioned below, or further steps may be added. Although the UE 115-*b* and the network entity 105-*b* are shown performing the operations of the process flow 700, some aspects of some operations may also be performed by one or more other wireless devices.

At 705, the network entity 105-*b* may transmit a DCI message to the UE 115-*b*. In some examples, the UE may receive the DCI message in a first time slot, and the DCI message may indicate at least a second time slot for the UE 115-*b* to transmit feedback according to a codebook size. For example, the DCI message may indicate for the UE 115-*b* to transmit feedback according to the codebook size associated with a PMO-based codebook.

At 710, the UE 115-*b* may monitor a quantity of PMOs within at least a subset of a quantity of time slots that occur before the second time slot. The quantity of PMOs may include a first set of one or more PMOs associated with a first codebook generation characteristic and a second set of one or more PMOs associated with a second codebook generation characteristic.

The first codebook generation characteristic, the second codebook generation characteristic, or both may include an index associated with a CORESET pool, a transmission priority, a type of unicast or multicast communication, one or more other characteristics, or any combination thereof.

For example, the UE 115-*b* may receive a message indicating a configuration of a set of downlink control resources in one or more component carriers. The set of downlink control resources may include a first subset of downlink control resources associated with a first CORESET pool and a second subset of downlink control resources associated with a second CORESET pool. The UE 115-*b* may identify a first TRP associated with a first CORESET pool and a second TRP associated with a second CORESET pool based on the configuration.

The UE 115-*b* may generate a first codebook having the first codebook size based on a quantity of PMOs included in the first set of one or more PMOs, and each PMO of the first set of one or more PMOs may be associated with the first CORESET pool. In this example, the first codebook generation characteristic may include a first index (e.g., a coresetPoolIndex value of 0) associated with the first CORESET pool. The UE 115-*b* may generate a second codebook having a second codebook size based on a second quantity of PMOs included in the second set of one or more PMOs, and each PMO of the second set of one or more PMOs may be associated with the second CORESET pool. In this example, the second codebook generation characteristic may include a second index (e.g., a coresetPoolIndex value of 1) associated with the second CORESET pool.

In some other examples, the UE 115-*b* may receive a message indicating a configuration of the first codebook associated with a first priority and the second codebook associated with a second priority. The UE 115-*b* may generate the first codebook having the first codebook size based on the quantity of PMOs included in the first set of one or more PMOs. For example, each PMO of the first set of one or more PMOs may be associated with the first priority, and, in this example, the first codebook generation characteristic may include the first priority (e.g., a priority 1 or a high priority).

The UE 115-*b* may generate the second codebook having the second codebook size based on a second quantity of PMOs included in the second set of one or more PMOs. For example, each PMO of the second set of one or more PMOs may be associated with the second priority, and, in this example, the second codebook generation characteristic may include the second priority (e.g., a priority 0 or a low priority).

In some examples, the UE 115-*b* may receive a first set of one or more DCI messages via the first set of one or more PMOs. The first set of one or more PMOs may be associated with the first priority based on each DCI message of the first set of one or more DCI messages being associated with a first format (e.g., a DCI format 1_1/1_2) and including a priority field. For example, the priority field may be configured to indicate a priority of a transmission associated with the respective DCI message.

Further, the UE 115-*b* may receive a second set of one or more DCI messages via the second set of one or more PMOs. The second set of one or more PMOs may be associated with the second priority based on each DCI message of the second set of one or more DCI messages being associated with the first format (e.g., including the priority field with the DCI format 1_1/1_2) or being associated with a second format (e.g., a DCI format 1_0) that does not include a priority field.

In some examples, the UE 115-*b* may generate the first codebook associated with the first codebook size according to the first type of codebook. For example, the UE 115-*b* may generate the first codebook based on the quantity of PMOs included in the first set of one or more PMOs associated with the first codebook generation characteristic (e.g., a CORESET index, a priority, or the like).

Further, the UE 115-*b* may generate the second codebook associated with the second codebook size according to the second type of codebook. For example, the UE 115-*b* may generate the second codebook according to a quantity of PDSCH reception occasions (e.g., a Type 1 codebook) or a quantity of DAIs monitored by the UE 115-*b* via the quantity of PMOs (e.g., a Type 2 codebook).

In some examples, a PMO of the quantity of PMOs may be included in the first set of one or more PMOs and the second set of one or more PMOs. For example, the PMO may be associated with the first CORESET pool and the second CORESET pool based on having the first index and the second index (e.g., being associated with the coresetPoolIndex values of 0 and 1). Or, the PMO may be associated with the first priority and the second priority. That is, a PMO may be in one or both of the PMO sets.

In some examples, the first codebook generation characteristic may include a unicast communication type associated with the first set of one or more PMOs. Additionally, or alternatively, the second codebook generation characteristic may include a multicast communication type associated with the second set of one or more PMOs.

In some examples, the UE 115-*b* may receive a message indicating a first type of codebook associated with the first codebook generation characteristic and a second type of codebook associated with the second codebook generation characteristic. The first type of codebook may include a PMO-based codebook while the second type of codebook may include one of a semi static codebook (e.g., a Type 1 codebook), a dynamic codebook (e.g., a Type 2 codebook), or any combination thereof.

At 715, the UE 115-*b* may transmit feedback. For example, the UE 115-*b* may transmit the feedback according to at least the first codebook size based on the monitoring (e.g., the monitoring of the quantity of PMOs). The first codebook size may be based on a quantity of PMOs included in the first set of one or more PMOs associated with the first codebook generation characteristic.

In some cases, the UE 115-*b* may concatenate the first codebook and the second codebook. For example, the UE 115-*b* may transmit the feedback (e.g., joint feedback) via a same uplink resource in the second time slot according to a combination of the first codebook size and the second codebook size based on the concatenating.

In some cases, the UE 115-*b* may transmit second feedback via a second uplink resource. For example, the UE 115-*b* may transmit the second feedback (e.g., separate feedback) according to the second codebook having the second codebook size. In some cases, the second uplink resource is different than a first uplink resource via which the feedback is transmitted according to the first codebook having the first codebook size.

Figure 8:
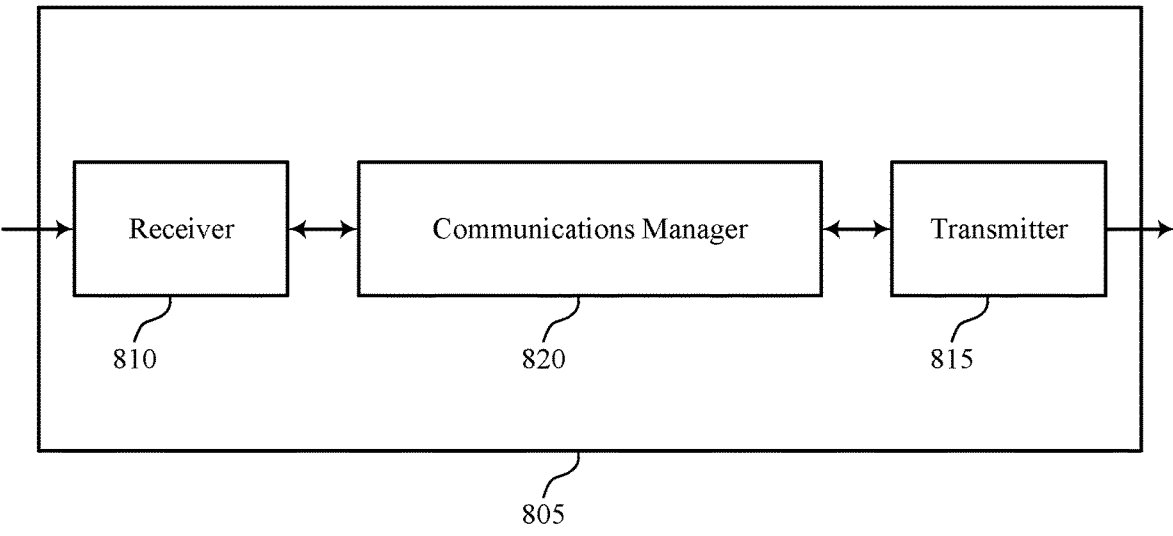
FIGS. 8 and 9 show block diagrams of devices that support PMO-based codebook generation according to varying codebook generation characteristics in accordance with one or more aspects of the present disclosure.

FIG. 8 shows a block diagram 800 of a device 805 that supports PMO-based codebook generation according to varying codebook generation characteristics in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one memory, which may be coupled to at least one processor, to, individually or collectively, support or enable the described techniques. The device 805 may also include one or more processors, memory coupled with the one or more processors, and instructions stored in the memory that are executable by the one or more processors to enable the one or more processors to perform the PMO-based codebook generation according to varying codebook generation characteristics features discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to PMO-based codebook generation according to varying codebook generation characteristics). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PMO-based codebook generation according to varying codebook generation characteristics). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PMO-based codebook generation according to varying codebook generation characteristics as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one memory and at least one processor coupled to the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 is capable of, configured to, or operable to support a means for receiving, in a first time slot, a DCI message indicating at least a second time slot for the UE to transmit feedback according to a codebook size. The communications manager 820 is capable of, configured to, or operable to support a means for monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The communications manager 820 is capable of, configured to, or operable to support a means for transmitting, via the second time slot, the feedback according to at least a first codebook size based on the monitoring, where the first codebook size is based on a quantity of PMOs included in the first set of one or more PMOs associated with the first codebook generation characteristic.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

Figure 9:
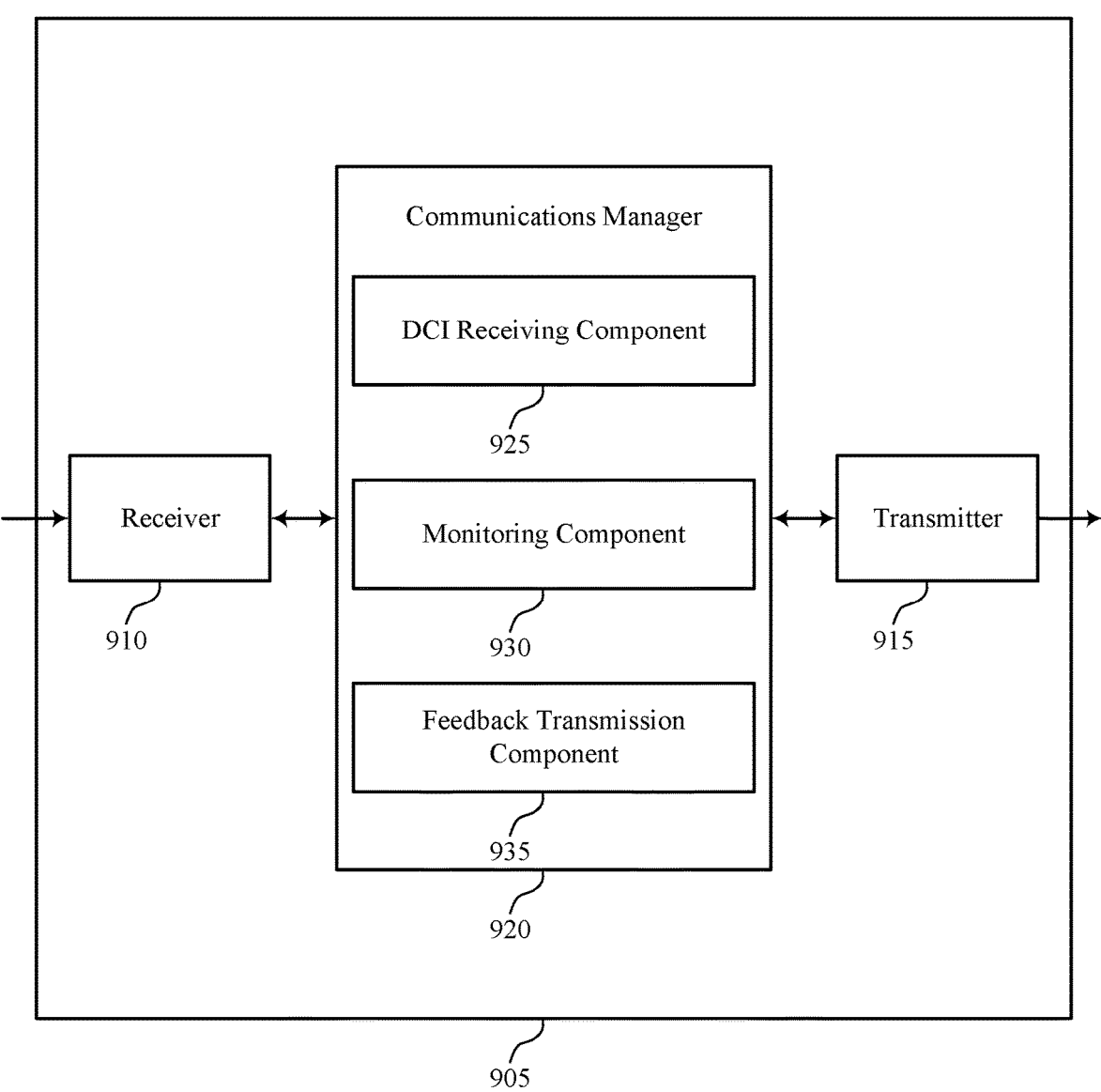

FIG. 9 shows a block diagram 900 of a device 905 that supports PMO-based codebook generation according to varying codebook generation characteristics in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one memory, which may be coupled to at least one processor, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to PMO-based codebook generation according to varying codebook generation characteristics). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PMO-based codebook generation according to varying codebook generation characteristics). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PMO-based codebook generation according to varying codebook generation characteristics as described herein. For example, the communications manager 920 may include a DCI receiving component 925, a monitoring component 930, a feedback transmission component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The DCI receiving component 925 is capable of, configured to, or operable to support a means for receiving, in a first time slot, a DCI message indicating at least a second time slot for the UE to transmit feedback according to a codebook size. The monitoring component 930 is capable of, configured to, or operable to support a means for monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The feedback transmission component 935 is capable of, configured to, or operable to support a means for transmitting, via the second time slot, the feedback according to at least a first codebook size based on the monitoring, where the first codebook size is based on a quantity of PMOs included in the first set of one or more PMOs associated with the first codebook generation characteristic.

In some cases, the DCI receiving component 925 and the monitoring component 930 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the feedback transmission component 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
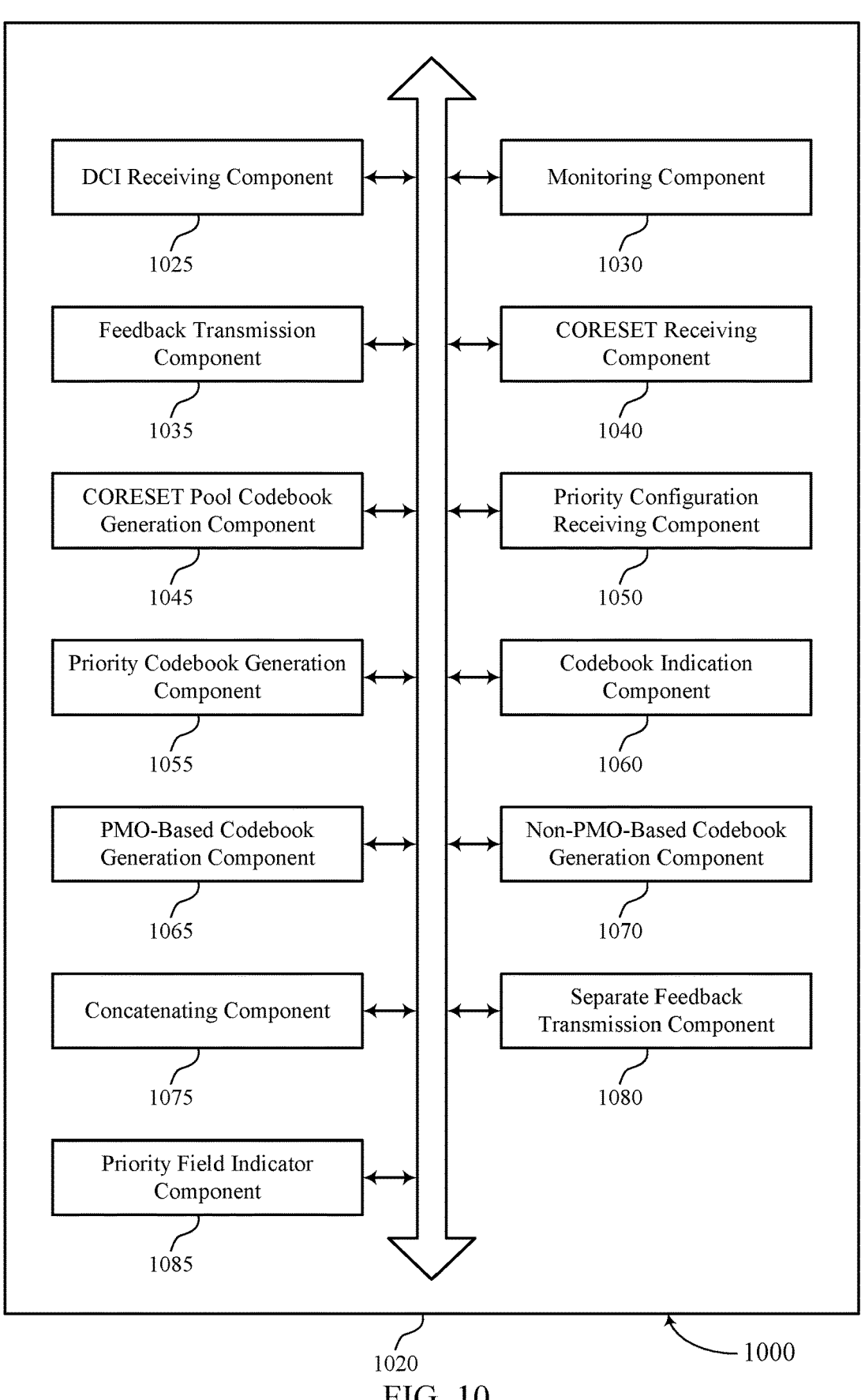
FIG. 10 shows a block diagram of a communications manager that supports PMO-based codebook generation according to varying codebook generation characteristics in accordance with one or more aspects of the present disclosure.

FIG. 10 shows a block diagram 1000 of a communications manager 1020 that supports PMO-based codebook generation according to varying codebook generation characteristics in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of PMO-based codebook generation according to varying codebook generation characteristics as described herein. For example, the communications manager 1020 may include a DCI receiving component 1025, a monitoring component 1030, a feedback transmission component 1035, a CORESET receiving component 1040, a CORESET pool codebook generation component 1045, a priority configuration receiving component 1050, a priority codebook generation component 1055, a codebook indication component 1060, a PMO-based codebook generation component 1065, a non-PMO-based codebook generation component 1070, a concatenating component 1075, a separate feedback transmission component 1080, a priority field indicator component 1085, or any combination thereof. Each of these components, or components or subcomponents thereof (e.g., one or more processors, one or more memories), may communicate, directly or indirectly, with one another (e.g., via one or more buses).

The communications manager 1020 may support wireless communication at a UE in accordance with examples as disclosed herein. The DCI receiving component 1025 is capable of, configured to, or operable to support a means for receiving, in a first time slot, a DCI message indicating at least a second time slot for the UE to transmit feedback according to a codebook size. The monitoring component 1030 is capable of, configured to, or operable to support a means for monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The feedback transmission component 1035 is capable of, configured to, or operable to support a means for transmitting, via the second time slot, the feedback according to at least a first codebook size based on the monitoring, where the first codebook size is based on a quantity of PMOs included in the first set of one or more PMOs associated with the first codebook generation characteristic.

In some examples, the CORESET receiving component 1040 is capable of, configured to, or operable to support a means for receiving a message that indicates a configuration of a set of downlink control resources in one or more component carriers, the set of downlink control resources including a first subset of downlink control resources associated with a first CORESET pool and a second subset of downlink control resources associated with a second CORESET pool. In some examples, the CORESET pool codebook generation component 1045 is capable of, configured to, or operable to support a means for generating a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool.

In some examples, the CORESET pool codebook generation component 1045 is capable of, configured to, or operable to support a means for generating a second codebook having a second codebook size based on a second quantity of PMOs included in the second set of one or more PMOs, where each PMO of the second set of one or more PMOs is associated with the second CORESET pool, and where the second codebook generation characteristic includes a second index associated with the second CORESET pool.

In some examples, the concatenating component 1075 is capable of, configured to, or operable to support a means for concatenating the first codebook with a second codebook having a second codebook size that is based on a second quantity of PMOs included in the second set of one or more PMOs, where the feedback is transmitted via a same uplink resource in the second time slot according to a combination of the first codebook size and the second codebook size based on the concatenating.

In some examples, the separate feedback transmission component 1080 is capable of, configured to, or operable to support a means for transmitting, via a second uplink resource, second feedback according to a second codebook having a second codebook size that is based on a second quantity of PMOs included in the second set of one or more PMOs and associated with the second CORESET pool, where the second uplink resource is different than a first uplink resource via which the feedback is transmitted according to the first codebook having the first codebook size.

In some examples, at least one PMO of the quantity of PMOs is included in both the first set of one or more PMOs and the second set of one or more PMOs based on the at least one PMO being associated with both the first CORESET pool and the second CORESET pool.

In some examples, the priority configuration receiving component 1050 is capable of, configured to, or operable to support a means for receiving a message that indicates a configuration of a first codebook associated with a first priority and a second codebook associated with a second priority. In some examples, the priority codebook generation component 1055 is capable of, configured to, or operable to support a means for generating the first codebook having the first codebook size based on the quantity of PMOs included in the first set of one or more PMOs, where each PMO of the first set of one or more PMOs is associated with the first priority, and where the first codebook generation characteristic includes the first priority.

In some examples, the priority codebook generation component 1055 is capable of, configured to, or operable to support a means for generating the second codebook having a second codebook size based on a second quantity of PMOs included in the second set of one or more PMOs, where each PMO in the second set of one or more PMOs is associated with the second priority, and where the second codebook generation characteristic includes the second priority.

In some examples, the priority field indicator component 1085 is capable of, configured to, or operable to support a means for receiving, via the first set of one or more PMOs, a first set of one or more DCI messages, where the first set of one or more PMOs is associated with the first priority based on each DCI message of the first set of one or more DCI messages being associated with a first format and including a priority field configured to indicate a priority of a transmission associated with the respective DCI message. In some examples, the priority field indicator component 1085 is capable of, configured to, or operable to support a means for receiving, via the second set of one or more PMOs, a second set of one or more DCI messages, where the second set of one or more PMOs is associated with the second priority based on each DCI message of the second set of one or more DCI messages being associated with the first format and including the priority field or being associated with a second format that does not include the priority field.

In some examples, the separate feedback transmission component 1080 is capable of, configured to, or operable to support a means for transmitting, via a second uplink resource, second feedback according to the second codebook having a second codebook size that is based on a second quantity of PMOs included in the second set of one or more PMOs and associated with the second priority, where the second uplink resource is different than a first uplink resource via which the feedback is transmitted according to the first codebook having the first codebook size.

In some examples, at least one PMO of the set of multiple PMOs is included in both the first set of one or more PMOs and the second set of one or more PMOs based on the at least one PMO being associated with both the first priority and the second priority.

In some examples, the codebook indication component 1060 is capable of, configured to, or operable to support a means for receiving a message that indicates a first type of codebook associated with the first codebook generation characteristic and a second type of codebook associated with the second codebook generation characteristic, the first type of codebook including a PMO-based codebook, and the second type of codebook including one of a semi-static codebook or a dynamic codebook. In some examples, the PMO-based codebook generation component 1065 is capable of, configured to, or operable to support a means for generating a first codebook associated with the first codebook size according to the first type of codebook and based on the quantity of PMOs included in the first set of one or more PMOs associated with the first codebook generation characteristic. In some examples, the non-PMO-based codebook generation component 1070 is capable of, configured to, or operable to support a means for generating a second codebook associated with a second codebook size according to the second type of codebook and either a quantity of physical downlink shared channel reception occasions or a quantity of downlink assignment indices monitored by the UE via the set of multiple PMOs.

In some examples, the concatenating component 1075 is capable of, configured to, or operable to support a means for concatenating the first codebook with the second codebook, where the feedback is transmitted via a same uplink resource in the second time slot according to a combination of the first codebook size and the second codebook size based on the concatenating.

In some examples, the separate feedback transmission component 1080 is capable of, configured to, or operable to support a means for transmitting, via a second uplink resource, second feedback according to the second codebook size, where the second uplink resource is different than a first uplink resource via which the feedback is transmitted.

In some examples, the first codebook generation characteristic include a unicast communication type associated with the first set of one or more PMOs and the second codebook generation characteristic includes a multicast communication type associated with the second set of one or more PMOs.

In some cases, the DCI receiving component 1025, the monitoring component 1030, the CORESET receiving component 1040, the priority configuration receiving component 1050, the codebook indication component 1060, and the priority field indicator component 1085 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the feedback transmission component 1035, the CORESET pool codebook generation component 1045, the priority codebook generation component 1055, the PMO-based codebook generation component 1065, the non-PMO-based codebook generation component 1070, the concatenating component 1075, and the separate feedback transmission component 1080, discussed herein.

Figure 11:
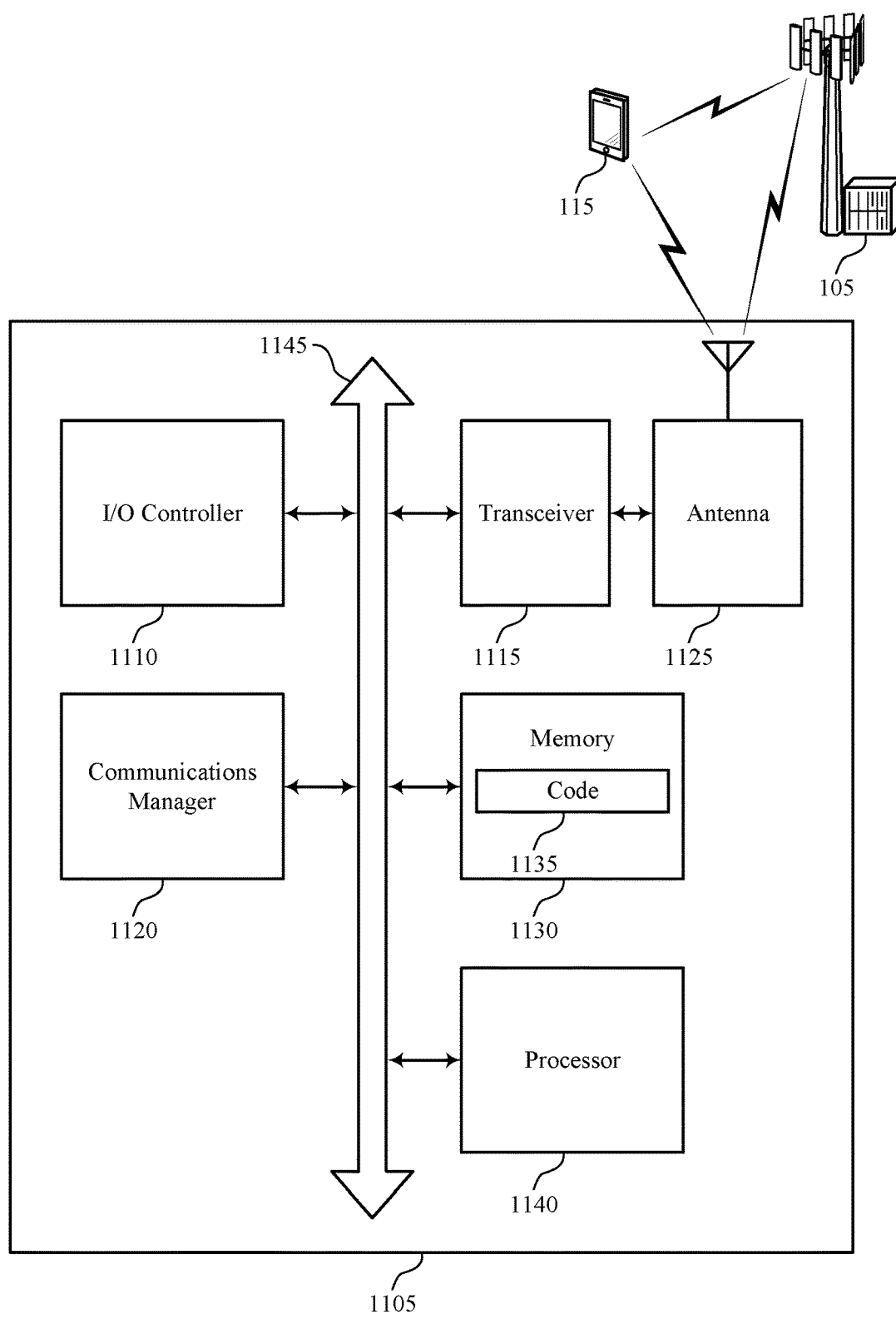
FIG. 11 shows a diagram of a system including a device that supports PMO-based codebook generation according to varying codebook generation characteristics in accordance with one or more aspects of the present disclosure.

FIG. 11 shows a diagram of a system 1100 including a device 1105 that supports PMO-based codebook generation according to varying codebook generation characteristics in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting PMO-based codebook generation according to varying codebook generation characteristics). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein.

The communications manager 1120 may support wireless communication at a UE in accordance with examples as disclosed herein. For example, the communications manager 1120 is capable of, configured to, or operable to support a means for receiving, in a first time slot, a DCI message indicating at least a second time slot for the UE to transmit feedback according to a codebook size. The communications manager 1120 is capable of, configured to, or operable to support a means for monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The communications manager 1120 is capable of, configured to, or operable to support a means for transmitting, via the second time slot, the feedback according to at least a first codebook size based on the monitoring, where the first codebook size is based on a quantity of PMOs included in the first set of one or more PMOs associated with the first codebook generation characteristic.

By including or configuring the communications manager 1120 in accordance with examples as described herein, the device 1105 may support techniques for more efficient utilization of communication resources and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of PMO-based codebook generation according to varying codebook generation characteristics as described herein, or the at least one processor 1140 and the at least one memory 1130 may be otherwise configured to, individually or collectively, perform or support such operations.

Figure 12:
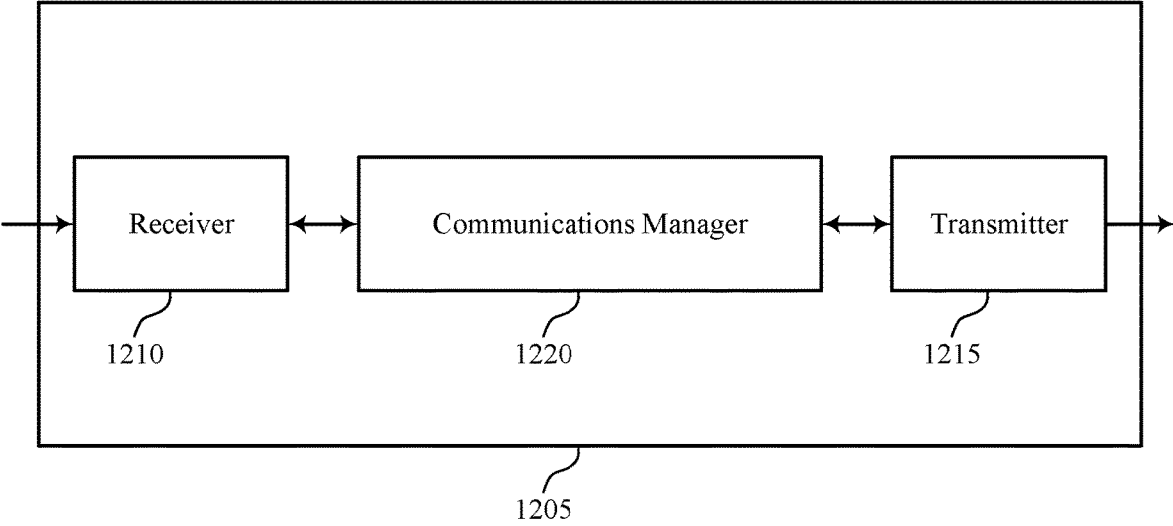
FIGS. 12 and 13 show block diagrams of devices that support PMO-based codebook generation according to varying codebook generation characteristics in accordance with one or more aspects of the present disclosure.

FIG. 12 shows a block diagram 1200 of a device 1205 that supports PMO-based codebook generation according to varying codebook generation characteristics in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one memory, which may be coupled to at least one processor, to, individually or collectively, support or enable the described techniques. The device 1205 may also include a processor. one or more processors, memory coupled with the one or more processors, and instructions stored in the memory that are executable by the one or more processors to enable the one or more processors to perform the PMO-based codebook generation according to varying codebook generation characteristics features discussed herein. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of PMO-based codebook generation according to varying codebook generation characteristics as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 is capable of, configured to, or operable to support a means for transmitting, in a first time slot, a DCI message indicating at least a second time slot for a UE to transmit feedback according to a codebook size. The communications manager 1220 is capable of, configured to, or operable to support a means for receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for more efficient utilization of communication resources.

Figure 13:
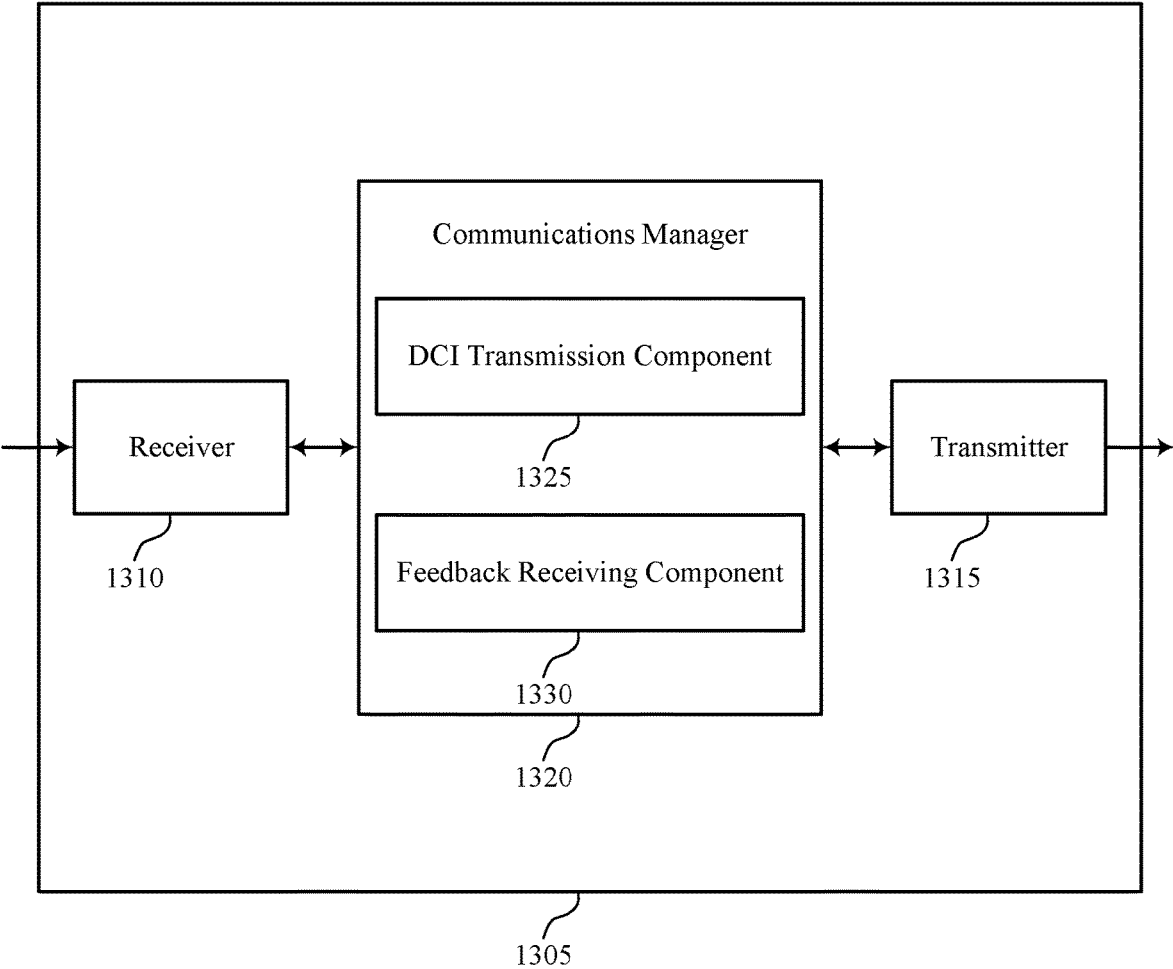
Figure 13:

FIG. 13 shows a block diagram 1300 of a device 1305 that supports PMO-based codebook generation according to varying codebook generation characteristics in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one memory, which may be coupled to at least one processor, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of PMO-based codebook generation according to varying codebook generation characteristics as described herein. For example, the communications manager 1320 may include a DCI transmission component 1325 a feedback receiving component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The DCI transmission component 1325 is capable of, configured to, or operable to support a means for transmitting, in a first time slot, a DCI message indicating at least a second time slot for a UE to transmit feedback according to a codebook size. The feedback receiving component 1330 is capable of, configured to, or operable to support a means for receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

In some cases, the DCI transmission component 1325 and the feedback receiving component 1330, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI transmission component 1325 and the feedback receiving component 1330 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
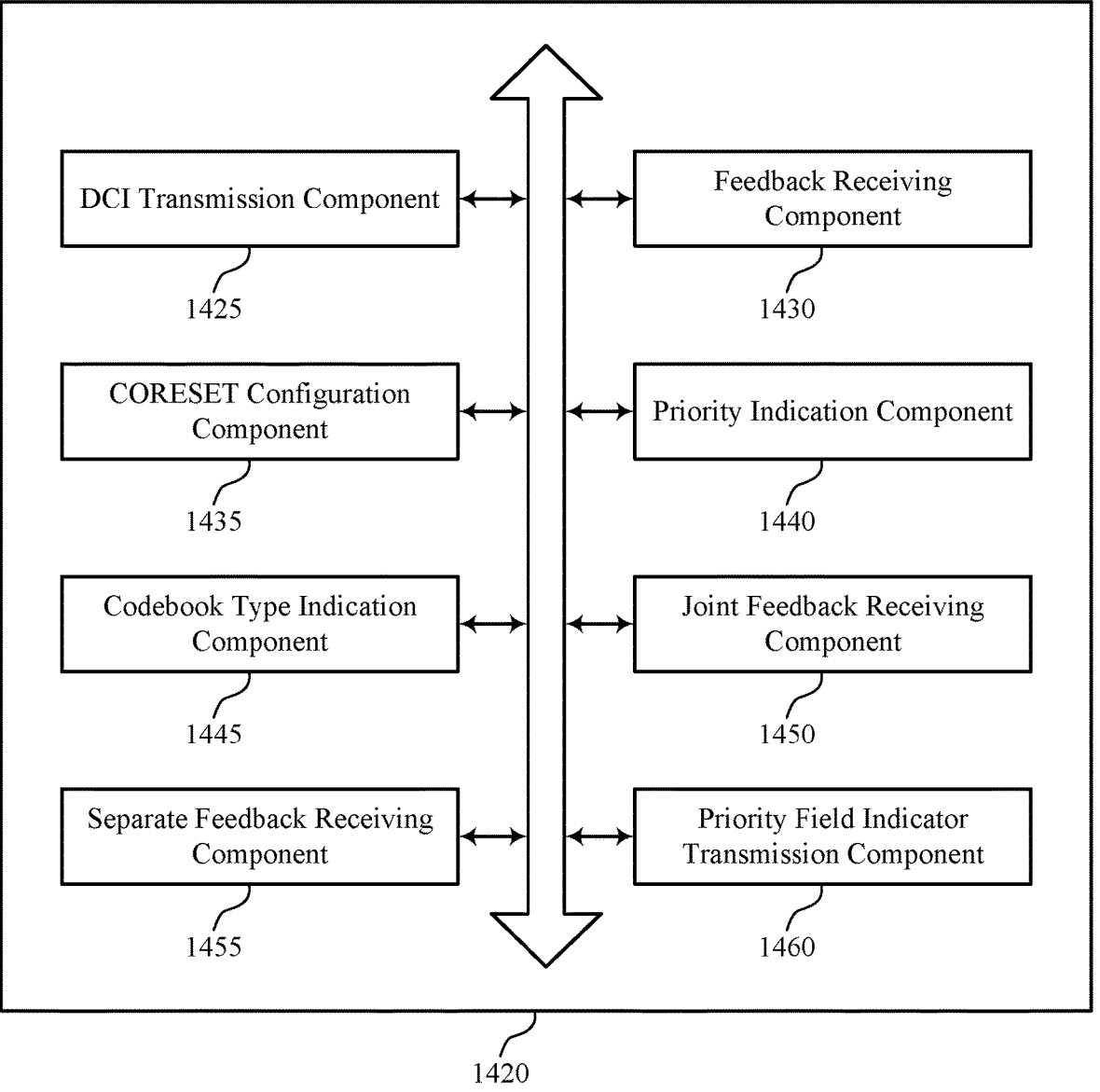
FIG. 14 shows a block diagram of a communications manager that supports PMO-based codebook generation according to varying codebook generation characteristics in accordance with one or more aspects of the present disclosure.

FIG. 14 shows a block diagram 1400 of a communications manager 1420 that supports PMO-based codebook generation according to varying codebook generation characteristics in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of PMO-based codebook generation according to varying codebook generation characteristics as described herein. For example, the communications manager 1420 may include a DCI transmission component 1425, a feedback receiving component 1430, a CORESET configuration component 1435, a priority indication component 1440, a codebook type indication component 1445, a joint feedback receiving component 1450, a separate feedback receiving component 1455, a priority field indicator transmission component 1460, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The DCI transmission component 1425 is capable of, configured to, or operable to support a means for transmitting, in a first time slot, a DCI message indicating at least a second time slot for a UE to transmit feedback according to a codebook size. The feedback receiving component 1430 is capable of, configured to, or operable to support a means for receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

In some examples, the CORESET configuration component 1435 is capable of, configured to, or operable to support a means for transmitting a message that indicates a configuration of a set of downlink control resources in one or more component carriers, the set of downlink control resources including a first subset of downlink control resources associated with a first CORESET pool and a second subset of downlink control resources associated with a second CORESET pool, where the feedback is received according to at least a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool.

In some examples, to support receiving the feedback, the joint feedback receiving component 1450 is capable of, configured to, or operable to support a means for receiving, via a same uplink resource in the second time slot, the feedback according to a combination of the first codebook size of the first codebook and a second codebook size of a second codebook, the second codebook size based on a second quantity of PMOs included in the second set of one or more PMOs, where each PMO of the second set of one or more PMOs is associated with the second CORESET pool, and where the second codebook generation characteristic includes a second index associated with the second CORESET pool.

In some examples, the separate feedback receiving component 1455 is capable of, configured to, or operable to support a means for receiving, via a second uplink resource, second feedback according to a second codebook having a second codebook size that is based on a second quantity of PMOs included in the second set of one or more PMOs, where the second uplink resource is different than a first uplink resource via which the feedback is transmitted according to the first codebook having the first codebook size, and where each PMO of the second set of one or more PMOs is associated with the second CORESET pool, the second codebook generation characteristic including a second index associated with the second CORESET pool.

In some examples, the priority indication component 1440 is capable of, configured to, or operable to support a means for transmitting a message that indicates a configuration of a first codebook associated with a first priority and a second codebook associated with a second priority, where the feedback is received according to at least the first codebook having the first codebook size based on the quantity of PMOs included in the first set of one or more PMOs, where each PMO of the first set of one or more PMOs is associated with the first priority, and where the first codebook generation characteristic includes the first priority.

In some examples, to support receiving the feedback, the separate feedback receiving component 1455 is capable of, configured to, or operable to support a means for receiving, via a second uplink resource, second feedback according to the second codebook having a second codebook size that is based on a second quantity of PMOs included in the second set of one or more PMOs and associated with the second priority, where the second uplink resource is different than a first uplink resource via which the feedback is transmitted according to the first codebook having the first codebook size, and where each PMO of the second set of one or more PMOs is associated with the second priority, the second codebook generation characteristic including the second priority.

In some examples, the priority field indicator transmission component 1460 is capable of, configured to, or operable to support a means for transmitting, via the first set of one or more PMOs, a first set of one or more DCI messages, where the first set of one or more PMOs is associated with the first priority based on each DCI message of the first set of one or more DCI messages being associated with a first format and including a priority field configured to indicate a priority of a transmission associated with the respective DCI message. In some examples, the priority field indicator transmission component 1460 is capable of, configured to, or operable to support a means for transmitting, via the second set of one or more PMOs, a second set of one or more DCI messages, where the second set of one or more PMOs is associated with the second priority based on each DCI message of the second set of one or more DCI messages being associated with the first format and including the priority field or being associated with a second format that does not include the priority field.

In some examples, the codebook type indication component 1445 is capable of, configured to, or operable to support a means for transmitting a message that indicates a first type of codebook associated with the first codebook generation characteristic and a second type of codebook associated with the second codebook generation characteristic, the first type of codebook including a PMO-based codebook, and the second type of codebook including one of a semi-static codebook or a dynamic codebook, where the feedback is received according to at least a first codebook associated with the first codebook size according to the first type of codebook and based on the quantity of PMOs included in the first set of one or more PMOs associated with the first codebook generation characteristic and a second codebook associated with a second codebook size according to the second type of codebook and either a quantity of physical downlink shared channel reception occasions or a quantity of downlink assignment indices transmitted via the set of multiple PMOs.

In some examples, to support receiving the feedback, the joint feedback receiving component 1450 is capable of, configured to, or operable to support a means for receiving the feedback via a same uplink resource in the second time slot according to a combination of the first codebook size associated with the first type of codebook and the second codebook size associated with the second type of codebook.

In some examples, the separate feedback receiving component 1455 is capable of, configured to, or operable to support a means for receiving, via a second uplink resource, second feedback according to the second type of codebook having the second codebook size, where the second uplink resource is different than a first uplink resource via which the feedback is transmitted according to the first type of codebook having the first codebook size.

In some examples, the first codebook generation characteristic includes a unicast communication type associated with the first set of one or more PMOs and the second codebook generation characteristic includes a multicast communication type associated with the second set of one or more PMOs.

In some cases, the DCI transmission component 1425, the feedback receiving component 1430, the CORESET configuration component 1435, the priority indication component 1440, the codebook type indication component 1445, the joint feedback receiving component 1450, the separate feedback receiving component 1455, and the priority field indicator transmission component 1460 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of DCI transmission component 1425, the feedback receiving component 1430, the CORESET configuration component 1435, the priority indication component 1440, the codebook type indication component 1445, the joint feedback receiving component 1450, the separate feedback receiving component 1455, and the priority field indicator transmission component 1460 discussed herein.

Figure 15:
FIG. 15 shows a diagram of a system including a device that supports PMO-based codebook generation according to varying codebook generation characteristics in accordance with one or more aspects of the present disclosure.

FIG. 15 shows a diagram of a system 1500 including a device 1505 that supports PMO-based codebook generation according to varying codebook generation characteristics in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting PMO-based codebook generation according to varying codebook generation characteristics). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some implementations, the at least one processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the at least one processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links).

For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 is capable of, configured to, or operable to support a means for transmitting, in a first time slot, a DCI message indicating at least a second time slot for a UE to transmit feedback according to a codebook size. The communications manager 1520 is capable of, configured to, or operable to support a means for receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic.

By including or configuring the communications manager 1520 in accordance with examples as described herein, the device 1505 may support techniques for more efficient utilization of communication resources and improved utilization of processing capability.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of PMO-based codebook generation according to varying codebook generation characteristics as described herein, or the at least one processor 1535 and the at least one memory 1525 may be otherwise configured to, individually or collectively, perform or support such operations.

FIG. 16 shows a flowchart illustrating a method 1600 that supports PMO-based codebook generation according to varying codebook generation characteristics in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, in a first time slot, a DCI message indicating at least a second time slot for the UE to transmit feedback according to a codebook size. The operations of block 1605 may be performed in accordance with examples as disclosed herein. In some examples, aspects of the operations of 1605 may be performed by a DCI receiving component 1025 as described with reference to FIG. 10.

At 1610, the method may include monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The operations of block 1610 may be performed in accordance with examples as disclosed herein. In some examples, aspects of the operations of 1610 may be performed by a monitoring component 1030 as described with reference to FIG. 10.

At 1615, the method may include transmitting, via the second time slot, the feedback according to at least a first codebook size based on the monitoring, where the first codebook size is based on a quantity of PMOs included in the first set of one or more PMOs associated with the first codebook generation characteristic. The operations of block 1615 may be performed in accordance with examples as disclosed herein. In some examples, aspects of the operations of 1615 may be performed by a feedback transmission component 1035 as described with reference to FIG. 10.

FIG. 17 shows a flowchart illustrating a method 1700 that supports PMO-based codebook generation according to varying codebook generation characteristics in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, in a first time slot, a DCI message indicating at least a second time slot for the UE to transmit feedback according to a codebook size. The operations of block 1705 may be performed in accordance with examples as disclosed herein. In some examples, aspects of the operations of 1705 may be performed by a DCI receiving component 1025 as described with reference to FIG. 10.

At 1710, the method may include receiving a message that indicates a configuration of a set of downlink control resources in one or more component carriers, the set of downlink control resources including a first subset of downlink control resources associated with a first CORESET pool and a second subset of downlink control resources associated with a second CORESET pool. The operations of block 1710 may be performed in accordance with examples as disclosed herein. In some examples, aspects of the operations of 1710 may be performed by a CORESET receiving component 1040 as described with reference to FIG. 10.

At 1715, the method may include monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The operations of block 1715 may be performed in accordance with examples as disclosed herein. In some examples, aspects of the operations of 1715 may be performed by a monitoring component 1030 as described with reference to FIG. 10.

At 1720, the method may include generating a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool. The operations of block 1720 may be performed in accordance with examples as disclosed herein. In some examples, aspects of the operations of 1720 may be performed by a CORESET pool codebook generation component 1045 as described with reference to FIG. 10.

At 1725, the method may include transmitting, via the second time slot, the feedback according to at least a first codebook size based on the monitoring, where the first codebook size is based on a quantity of PMOs included in the first set of one or more PMOs associated with the first codebook generation characteristic. The operations of block 1725 may be performed in accordance with examples as disclosed herein. In some examples, aspects of the operations of 1725 may be performed by a feedback transmission component 1035 as described with reference to FIG. 10.

FIG. 18 shows a flowchart illustrating a method 1800 that supports PMO-based codebook generation according to varying codebook generation characteristics in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, in a first time slot, a DCI message indicating at least a second time slot for the UE to transmit feedback according to a codebook size. The operations of block 1805 may be performed in accordance with examples as disclosed herein. In some examples, aspects of the operations of 1805 may be performed by a DCI receiving component 1025 as described with reference to FIG. 10.

At 1810, the method may include receiving a message that indicates a configuration of a first codebook associated with a first priority and a second codebook associated with a second priority. The operations of block 1810 may be performed in accordance with examples as disclosed herein. In some examples, aspects of the operations of 1810 may be performed by a priority configuration receiving component 1050 as described with reference to FIG. 10.

At 1815, the method may include monitoring a set of multiple PMOs within at least a subset of a set of multiple time slots that occur before the second time slot, where the set of multiple PMOs includes a first set of one or more PMOs associated with at least a first codebook generation characteristic and a second set of one or more PMOs associated with at least a second codebook generation characteristic. The operations of block 1815 may be performed in accordance with examples as disclosed herein. In some examples, aspects of the operations of 1815 may be performed by a monitoring component 1030 as described with reference to FIG. 10.

At 1820, the method may include generating the first codebook having the first codebook size based on the quantity of PMOs included in the first set of one or more PMOs, where each PMO of the first set of one or more PMOs is associated with the first priority, and where the first codebook generation characteristic includes the first priority. The operations of block 1820 may be performed in accordance with examples as disclosed herein. In some examples, aspects of the operations of 1820 may be performed by a priority codebook generation component 1055 as described with reference to FIG. 10.

At 1825, the method may include transmitting, via the second time slot, the feedback according to at least a first codebook size based on the monitoring, where the first codebook size is based on a quantity of PMOs included in the first set of one or more PMOs associated with the first codebook generation characteristic. The operations of block 1825 may be performed in accordance with examples as disclosed herein. In some examples, aspects of the operations of 1825 may be performed by a feedback transmission component 1035 as described with reference to FIG. 10.

FIG. 19 shows a flowchart illustrating a method 1900 that supports PMO-based codebook generation according to varying codebook generation characteristics in accordance with aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, in a first time slot, a DCI message indicating at least a second time slot for a UE to transmit feedback according to a codebook size. The operations of block 1905 may be performed in accordance with examples as disclosed herein. In some examples, aspects of the operations of 1905 may be performed by a DCI transmission component 1425 as described with reference to FIG. 14.

At 1910, the method may include receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic. The operations of block 1910 may be performed in accordance with examples as disclosed herein. In some examples, aspects of the operations of 1910 may be performed by a feedback receiving component 1430 as described with reference to FIG. 14.

FIG. 20 shows a flowchart illustrating a method 2000 that supports PMO-based codebook generation according to varying codebook generation characteristics in accordance with aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, in a first time slot, a DCI message indicating at least a second time slot for a UE to transmit feedback according to a codebook size. The operations of block 2005 may be performed in accordance with examples as disclosed herein. In some examples, aspects of the operations of 2005 may be performed by a DCI transmission component 1425 as described with reference to FIG. 14.

At 2010, the method may include transmitting a message that indicates a configuration of a set of downlink control resources in one or more component carriers, the set of downlink control resources including a first subset of downlink control resources associated with a first CORESET pool and a second subset of downlink control resources associated with a second CORESET pool, where the feedback is received according to at least a first codebook having the first codebook size based on the quantity of PMOs included in the first set of one or more PMOs, where each PMO of the first set of one or more PMOs is associated with the first CORESET pool, and where the first codebook generation characteristic includes a first index associated with the first CORESET pool. The operations of block 2010 may be performed in accordance with examples as disclosed herein. In some examples, aspects of the operations of 2010 may be performed by a CORESET configuration component 1435 as described with reference to FIG. 14.

At 2015, the method may include receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first code-book size is based on a quantity of PMOs included in the first set of one or more PMOs associated with the first codebook generation characteristic. The operations of block 2015 may be performed in accordance with examples as disclosed herein. In some examples, aspects of the operations of 2015 may be performed by a feedback receiving component 1430 as described with reference to FIG. 14.

FIG. 21 shows a flowchart illustrating a method 2100 that supports PMO-based codebook generation according to varying codebook generation characteristics in accordance with aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, in a first time slot, a DCI message indicating at least a second time slot for a UE to transmit feedback according to a codebook size. The operations of block 2105 may be performed in accordance with examples as disclosed herein. In some examples, aspects of the operations of 2105 may be performed by a DCI transmission component 1425 as described with reference to FIG. 14.

At 2110, the method may include transmitting a message that indicates a configuration of a first codebook associated with a first priority and a second codebook associated with a second priority, where the feedback is received according to at least the first codebook having the first codebook size based on the quantity of PMOs included in the first set of one or more PMOs, where each PMO of the first set of one or more PMOs is associated with the first priority, and where the first codebook generation characteristic includes the first priority. The operations of block 2110 may be performed in accordance with examples as disclosed herein. In some examples, aspects of the operations of 2110 may be performed by a priority indication component 1440 as described with reference to FIG. 14.

At 2115, the method may include receiving, via the second time slot, feedback according to at least a first codebook size, where a set of multiple PMOs occur within at least a subset of a set of multiple time slots that occur before the second time slot, the set of multiple PMOs including a first set of one or more PMOs associated with at least a first codebook generation characteristic and a second set of one or more PMOs associated with at least a second codebook generation characteristic, and where the first codebook size is based on a quantity of PMOs included in the first set of one or more PMOs associated with the first codebook generation characteristic. The operations of block 2115 may be performed in accordance with examples as disclosed herein. In some examples, aspects of the operations of 2115 may be performed by a feedback receiving component 1430 as described with reference to FIG. 14.

The following provides an overview of aspects of the present disclosure:

Aspect 1: A method for wireless communication at a UE, comprising: receiving, in a first time slot, a DCI message indicating at least a second time slot for the UE to transmit feedback according to a codebook size; monitoring a plurality of PMOs within at least a subset of a plurality of time slots that occur before the second time slot, wherein the plurality of PMOs comprises a first set of one or more PMOs associated with at least a first codebook generation characteristic and a second set of one or more PMOs associated with at least a second codebook generation characteristic; and transmitting, via the second time slot, the feedback according to at least a first codebook size based at least in part on the monitoring, wherein the first codebook size is based at least in part on a quantity of PMOs included in the first set of one or more PMOs associated with the first codebook generation characteristic.

Aspect 2: The method of aspect 1, further comprising: receiving a message that indicates a configuration of a set of downlink control resources in one or more component carriers, the set of downlink control resources comprising a first subset of downlink control resources associated with a first CORESET pool and a second subset of downlink control resources associated with a second CORESET pool; and generating a first codebook having the first codebook size based at least in part on the quantity of PMOs included in the first set of one or more PMOs, wherein each PMO of the first set of one or more PMOs is associated with the first CORESET pool, and wherein the first codebook generation characteristic comprises a first index associated with the first CORESET pool.

Aspect 3: The method of aspect 2, further comprising: generating a second codebook having a second codebook size based at least in part on a second quantity of PMOs included in the second set of one or more PMOs, wherein each PMO of the second set of one or more PMOs is associated with the second CORESET pool, and wherein the second codebook generation characteristic comprises a second index associated with the second CORESET pool.

Aspect 4: The method of aspect 2, further comprising: concatenating the first codebook with a second codebook having a second codebook size that is based at least in part on a second quantity of PMOs included in the second set of one or more PMOs, wherein the feedback is transmitted via a same uplink resource in the second time slot according to a combination of the first codebook size and the second codebook size based at least in part on the concatenating.

Aspect 5: The method of aspect 2, further comprising: transmitting, via a second uplink resource, second feedback according to a second codebook having a second codebook size that is based at least in part on a second quantity of PMOs included in the second set of one or more PMOs and associated with the second CORESET pool, wherein the second uplink resource is different than a first uplink resource via which the feedback is transmitted according to the first codebook having the first codebook size.

Aspect 6: The method of any of aspects 2 through 5, wherein at least one PMO of the quantity of PMOs is included in both the first set of one or more PMOs and the second set of one or more PMOs based at least in part on the at least one PMO being associated with both the first CORESET pool and the second CORESET pool.

Aspect 7: The method of any of aspects 1 through 6, further comprising: receiving a message that indicates a configuration of a first codebook associated with a first priority and a second codebook associated with a second priority; and generating the first codebook having the first codebook size based at least in part on the quantity of PMOs included in the first set of one or more PMOs, wherein each PMO of the first set of one or more PMOs is associated with the first priority, and wherein the first codebook generation characteristic comprises the first priority.

Aspect 8: The method of aspect 7, further comprising: generating the second codebook having a second codebook size based at least in part on a second quantity of PMOs included in the second set of one or more PMOs, wherein each PMO in the second set of one or more PMOs is associated with the second priority, and wherein the second codebook generation characteristic comprises the second priority.

Aspect 9: The method of any of aspects 7 through 8, further comprising: receiving, via the first set of one or more PMOs, a first set of one or more DCI messages, wherein the first set of one or more PMOs is associated with the first priority based at least in part on each DCI message of the first set of one or more DCI messages being associated with a first format and comprising a priority field configured to indicate a priority of a transmission associated with the respective DCI message; and receiving, via the second set of one or more PMOs, a second set of one or more DCI messages, wherein the second set of one or more PMOs is associated with the second priority based at least in part on each DCI message of the second set of one or more DCI messages being associated with the first format and comprising the priority field or being associated with a second format that does not comprise the priority field.

Aspect 10: The method of any of aspects 7 through 9, further comprising: transmitting, via a second uplink resource, second feedback according to the second codebook having a second codebook size that is based at least in part on a second quantity of PMOs included in the second set of one or more PMOs and associated with the second priority, wherein the second uplink resource is different than a first uplink resource via which the feedback is transmitted according to the first codebook having the first codebook size.

Aspect 11: The method of any of aspects 7 through 10, wherein at least one PMO of the plurality of PMOs is included in both the first set of one or more PMOs and the second set of one or more PMOs based at least in part on the at least one PMO being associated with both the first priority and the second priority.

Aspect 12: The method of any of aspects 1 through 11, further comprising: receiving a message that indicates a first type of codebook associated with the first codebook generation characteristic and a second type of codebook associated with the second codebook generation characteristic, the first type of codebook comprising a PMO-based codebook, and the second type of codebook comprising one of a semi-static codebook or a dynamic codebook; generating a first codebook associated with the first codebook size according to the first type of codebook and based at least in part on the quantity of PMOs included in the first set of one or more PMOs associated with the first codebook generation characteristic; and generating a second codebook associated with a second codebook size according to the second type of codebook and either a quantity of physical downlink shared channel reception occasions or a quantity of downlink assignment indices monitored by the UE via the plurality of PMOs.

Aspect 13: The method of aspect 12, further comprising: concatenating the first codebook with the second codebook, wherein the feedback is transmitted via a same uplink resource in the second time slot according to a combination of the first codebook size and the second codebook size based at least in part on the concatenating.

Aspect 14: The method of aspect 12, further comprising: transmitting, via a second uplink resource, second feedback according to the second codebook size, wherein the second uplink resource is different than a first uplink resource via which the feedback is transmitted.

Aspect 15: The method of any of aspects 1 through 14, wherein the first codebook generation characteristic comprise a unicast communication type associated with the first set of one or more PMOs and the second codebook generation characteristic comprises a multicast communication type associated with the second set of one or more PMOs.

Aspect 16: A method for wireless communication at a network entity, comprising: transmitting, in a first time slot, a DCI message indicating at least a second time slot for a UE to transmit feedback according to a codebook size; and receiving, via the second time slot, feedback according to at least a first codebook size, wherein a plurality of PMOs occur within at least a subset of a plurality of time slots that occur before the second time slot, the plurality of PMOs comprising a first set of one or more PMOs associated with at least a first codebook generation characteristic and a second set of one or more PMOs associated with at least a second codebook generation characteristic, and wherein the first codebook size is based at least in part on a quantity of PMOs included in the first set of one or more PMOs associated with the first codebook generation characteristic.

Aspect 17: The method of aspect 16, further comprising: transmitting a message that indicates a configuration of a set of downlink control resources in one or more component carriers, the set of downlink control resources comprising a first subset of downlink control resources associated with a first CORESET pool and a second subset of downlink control resources associated with a second CORESET pool, wherein the feedback is received according to at least a first codebook having the first codebook size based at least in part on the quantity of PMOs included in the first set of one or more PMOs, wherein each PMO of the first set of one or more PMOs is associated with the first CORESET pool, and wherein the first codebook generation characteristic comprises a first index associated with the first CORESET pool.

Aspect 18: The method of aspect 17, wherein receiving the feedback comprises: receiving, via a same uplink resource in the second time slot, the feedback according to a combination of the first codebook size of the first codebook and a second codebook size of a second codebook, the second codebook size based at least in part on a second quantity of PMOs included in the second set of one or more PMOs, wherein each PMO of the second set of one or more PMOs is associated with the second CORESET pool, and wherein the second codebook generation characteristic comprises a second index associated with the second CORESET pool.

Aspect 19: The method of aspect 17, further comprising: receiving, via a second uplink resource, second feedback according to a second codebook having a second codebook size that is based at least in part on a second quantity of PMOs included in the second set of one or more PMOs, wherein the second uplink resource is different than a first uplink resource via which the feedback is transmitted according to the first codebook having the first codebook size, and wherein each PMO of the second set of one or more PMOs is associated with the second CORESET pool, the second codebook generation characteristic comprising a second index associated with the second CORESET pool.

Aspect 20: The method of any of aspects 16 through 19, further comprising: transmitting a message that indicates a configuration of a first codebook associated with a first priority and a second codebook associated with a second priority, wherein the feedback is received according to at least the first codebook having the first codebook size based at least in part on the quantity of PMOs included in the first set of one or more PMOs, wherein each PMO of the first set of one or more PMOs is associated with the first priority, and wherein the first codebook generation characteristic comprises the first priority.

Aspect 21: The method of aspect 20, wherein receiving the feedback comprises: receiving, via a second uplink resource, second feedback according to the second codebook having a second codebook size that is based at least in part on a second quantity of PMOs included in the second set of one or more PMOs and associated with the second priority, wherein the second uplink resource is different than a first uplink resource via which the feedback is transmitted according to the first codebook having the first codebook size, and wherein each PMO of the second set of one or more PMOs is associated with the second priority, the second codebook generation characteristic comprising the second priority.

Aspect 22: The method of any of aspects 20 through 21, further comprising: transmitting, via the first set of one or more PMOs, a first set of one or more DCI messages, wherein the first set of one or more PMOs is associated with the first priority based at least in part on each DCI message of the first set of one or more DCI messages being associated with a first format and comprising a priority field configured to indicate a priority of a transmission associated with the respective DCI message; and transmitting, via the second set of one or more PMOs, a second set of one or more DCI messages, wherein the second set of one or more PMOs is associated with the second priority based at least in part on each DCI message of the second set of one or more DCI messages being associated with the first format and comprising the priority field or being associated with a second format that does not comprise the priority field.

Aspect 23: The method of any of aspects 16 through 22, further comprising: transmitting a message that indicates a first type of codebook associated with the first codebook generation characteristic and a second type of codebook associated with the second codebook generation characteristic, the first type of codebook comprising a PMO-based codebook, and the second type of codebook comprising one of a semi-static codebook or a dynamic codebook, wherein the feedback is received according to at least a first codebook associated with the first codebook size according to the first type of codebook and based at least in part on the quantity of PMOs included in the first set of one or more PMOs associated with the first codebook generation characteristic and a second codebook associated with a second codebook size according to the second type of codebook and either a quantity of physical downlink shared channel reception occasions or a quantity of downlink assignment indices transmitted via the plurality of PMOs.

Aspect 24: The method of aspect 23, wherein receiving the feedback comprises: receiving the feedback via a same uplink resource in the second time slot according to a combination of the first codebook size associated with the first type of codebook and the second codebook size associated with the second type of codebook.

Aspect 25: The method of aspect 23, further comprising: receiving, via a second uplink resource, second feed-back according to the second type of codebook having the second codebook size, wherein the second uplink resource is different than a first uplink resource via which the feedback is transmitted according to the first type of codebook having the first codebook size.

Aspect 26: The method of any of aspects 16 through 25, wherein the first codebook generation characteristic comprises a unicast communication type associated with the first set of one or more PMOs and the second codebook generation characteristic comprises a multi-cast communication type associated with the second set of one or more PMOs.

Aspect 27: An apparatus for wireless communication at a UE, comprising at least one memory; and at least one processor coupled with the at least one memory, the at least one processor configured to perform a method of any of aspects 1 through 15.

Aspect 28: An apparatus for wireless communication at a UE, comprising at least one means for performing a method of any of aspects 1 through 15.

Aspect 29: A non-transitory computer-readable medium storing code for wireless communication, the code comprising instructions executable by one or more processors to perform a method of any of aspects 1 through 15.

Aspect 30: An apparatus for wireless communication at a network entity, comprising at least one memory; and at least one processor coupled with the at least one memory, the at least one processor configured to perform a method of any of aspects 16 through 26.

Aspect 31: An apparatus for wireless communication at a network entity, comprising at least one means for performing a method of any of aspects 16 through 26.

Aspect 32: A non-transitory computer-readable medium storing code for wireless communication, the code comprising instructions executable by one or more processors to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by a processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

Any functions or operations described herein as being capable of being performed by a memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

at least one memory; and at least one processor coupled to the at least one memory, the at least one processor configured to:

receive, in a first time slot, a downlink control information message indicating at least a second time slot for the UE to transmit feedback according to a codebook size;

monitor a plurality of physical downlink control channel monitoring occasions within at least a subset of a plurality of time slots that occur before the second time slot, wherein the plurality of physical downlink control channel monitoring occasions comprises a first set of one or more physical downlink control channel monitoring occasions associated with at least a first codebook generation characteristic and a second set of one or more physical downlink control channel monitoring occasions associated with at least a second codebook generation characteristic;

generate a first codebook having a first codebook size based at least in part on the monitoring, wherein the first codebook includes a quantity of bits that is equal to a total quantity of physical downlink control channel monitoring occasions included in the first set of one or more physical downlink control channel monitoring occasions, and wherein each bit of the quantity of bits included in the first codebook corresponds to a respective physical downlink control channel monitoring occasion of the first set of one or more physical downlink control channel monitoring occasions; and transmit, via the second time slot, the feedback according to at least the first codebook size based at least in part on the monitoring.

2. The apparatus of claim 1, wherein the at least one processor is further configured to:

receive a message that indicates a configuration of a set of downlink control resources in one or more component carriers, the set of downlink control resources comprising a first subset of downlink control resources associated with a first control resource set pool and a second subset of downlink control resources associated with a second control resource set pool, wherein generating the;

first codebook having the first codebook size is based at least in part on the message, wherein each physical downlink control channel monitoring occasion of the first set of one or more physical downlink control channel monitoring occasions is associated with the first control resource set pool, and wherein the first codebook generation characteristic comprises a first index associated with the first control resource set pool.

3. The apparatus of claim 2, wherein the at least one processor is further configured to:

generate a second codebook having a second codebook size based at least in part on a second quantity of physical downlink control channel monitoring occasions included in the second set of one or more physical downlink control channel monitoring occasions, wherein each physical downlink control channel monitoring occasion of the second set of one or more physical downlink control channel monitoring occasions is associated with the second control resource set pool, and wherein the second codebook generation characteristic comprises a second index associated with the second control resource set pool.

4. The apparatus of claim 2, wherein the at least one processor is further configured to:

concatenate the first codebook with a second codebook having a second codebook size that is based at least in part on a second quantity of physical downlink control channel monitoring occasions included in the second set of one or more physical downlink control channel monitoring occasions, wherein the feedback is transmitted via a same uplink resource in the second time slot according to a combination of the first codebook size and the second codebook size based at least in part on the concatenating.

5. The apparatus of claim 2, wherein the at least one processor is further configured to:

transmit, via a second uplink resource, second feedback according to a second codebook having a second codebook size that is based at least in part on a second quantity of physical downlink control channel monitoring occasions included in the second set of one or more physical downlink control channel monitoring occasions and associated with the second control resource set pool, wherein the second uplink resource is different than a first uplink resource via which the feedback is transmitted according to the first codebook having the first codebook size.

6. The apparatus of claim 2, wherein at least one physical downlink control channel monitoring occasion of the quantity of physical downlink control channel monitoring occasions is included in both the first set of one or more physical downlink control channel monitoring occasions and the second set of one or more physical downlink control channel monitoring occasions based at least in part on the at least one physical downlink control channel monitoring occasion being associated with both the first control resource set pool and the second control resource set pool.

7. The apparatus of claim 1, wherein the at least one processor is further configured to:

receive a message that indicates a configuration of the first codebook associated with a first priority and a second codebook associated with a second priority, wherein generating;

the first codebook having the first codebook size is based at least in part on the message, wherein each physical downlink control channel monitoring occasion of the first set of one or more physical downlink control channel monitoring occasions is associated with the first priority, and wherein the first codebook generation characteristic comprises the first priority.

8. The apparatus of claim 7, wherein the at least one processor is further configured to:

generate the second codebook having a second codebook size based at least in part on a second quantity of physical downlink control channel monitoring occasions included in the second set of one or more physical downlink control channel monitoring occasions, wherein each physical downlink control channel monitoring occasion in the second set of one or more physical downlink control channel monitoring occasions is associated with the second priority, and wherein the second codebook generation characteristic comprises the second priority.

9. The apparatus of claim 7, wherein the at least one processor is further configured to:

receive, via the first set of one or more physical downlink control channel monitoring occasions, a first set of one or more downlink control information messages, wherein the first set of one or more physical downlink control channel monitoring occasions is associated with the first priority based at least in part on each downlink control information message of the first set of one or more downlink control information messages being associated with a first format and comprising a priority field configured to indicate a priority of a transmission associated with the respective downlink control information message; and receive, via the second set of one or more physical downlink control channel monitoring occasions, a second set of one or more downlink control information messages, wherein the second set of one or more physical downlink control channel monitoring occasions is associated with the second priority based at least in part on each downlink control information message of the second set of one or more downlink control information messages being associated with the first format and comprising the priority field or being associated with a second format that does not comprise the priority field.

10. The apparatus of claim 7, wherein the at least one processor is further configured to:

transmit, via a second uplink resource, second feedback according to the second codebook having a second codebook size that is based at least in part on a second quantity of physical downlink control channel monitoring occasions included in the second set of one or more physical downlink control channel monitoring occasions and associated with the second priority, wherein the second uplink resource is different than a first uplink resource via which the feedback is transmitted according to the first codebook having the first codebook size.

11. The apparatus of claim 7, wherein at least one physical downlink control channel monitoring occasion of the plurality of physical downlink control channel monitoring occasions is included in both the first set of one or more physical downlink control channel monitoring occasions and the second set of one or more physical downlink control channel monitoring occasions based at least in part on the at least one physical downlink control channel monitoring occasion being associated with both the first priority and the second priority.

12. The apparatus of claim 1, wherein the at least one processor is further configured to:

receive a message that indicates a first type of codebook associated with the first codebook generation characteristic and a second type of codebook associated with the second codebook generation characteristic, the first type of codebook comprising a physical downlink control channel monitoring occasion-based codebook, and the second type of codebook comprising one of a semi-static codebook or a dynamic codebook, wherein generating the first codebook having the first codebook size is in accordance with the first type of codebook indicated via the message; and generate a second codebook having a second codebook size according to the second type of codebook and either a quantity of physical downlink shared channel reception occasions or a quantity of downlink assignment indices monitored by the UE via the plurality of physical downlink control channel monitoring occasions.

13. The apparatus of claim 12, wherein the at least one processor is further configured to:

concatenate the first codebook with the second codebook, wherein the feedback is transmitted via a same uplink resource in the second time slot according to a combination of the first codebook size and the second codebook size based at least in part on the concatenating.

14. The apparatus of claim 12, wherein the at least one processor is further configured to:

transmit, via a second uplink resource, second feedback according to the second codebook size, wherein the second uplink resource is different than a first uplink resource via which the feedback is transmitted.

15. The apparatus of claim 1, wherein the first codebook generation characteristic comprise a unicast communication type associated with the first set of one or more physical downlink control channel monitoring occasions and the second codebook generation characteristic comprises a multicast communication type associated with the second set of one or more physical downlink control channel monitoring occasions.

16. An apparatus for wireless communication at a network entity, comprising:

at least one memory; and at least one processor coupled to the at least one memory, the at least one processor configured to:

transmit, in a first time slot, a downlink control information message indicating at least a second time slot for a user equipment (UE) to transmit feedback according to a codebook size; and receive, via the second time slot, feedback according to at least a first codebook size, wherein a plurality of physical downlink control channel monitoring occasions occur within at least a subset of a plurality of time slots that occur before the second time slot, the plurality of physical downlink control channel monitoring occasions comprising a first set of one or more physical downlink control channel monitoring occasions associated with at least a first codebook generation characteristic and a second set of one or more physical downlink control channel monitoring occasions associated with at least a second codebook generation characteristic, wherein a first codebook having the first codebook size includes a quantity of bits that is equal to a total quantity of physical downlink control channel monitoring occasions included in the first set of one or more physical downlink control channel monitoring occasions, and wherein each bit of the quantity of bits included in the first codebook corresponds to a respective physical downlink control channel monitoring occasion of the first set of one or more physical downlink control channel monitoring occasions.

17. The apparatus of claim 16, wherein the at least one processor is further configured to:

transmit a message that indicates a configuration of a set of downlink control resources in one or more component carriers, the set of downlink control resources comprising a first subset of downlink control resources associated with a first control resource set pool and a second subset of downlink control resources associated with a second control resource set pool, wherein the feedback is received according to at least the first codebook having the first codebook size, wherein each physical downlink control channel monitoring occasion of the first set of one or more physical downlink control channel monitoring occasions is associated with the first control resource set pool, and wherein the first codebook generation characteristic comprises a first index associated with the first control resource set pool.

18. The apparatus of claim 17, wherein, to receive the feedback, the at least one processor is further configured to:

receive, via a same uplink resource in the second time slot, the feedback according to a combination of the first codebook size of the first codebook and a second codebook size of a second codebook, the second codebook size based at least in part on a second quantity of physical downlink control channel monitoring occasions included in the second set of one or more physical downlink control channel monitoring occasions, wherein each physical downlink control channel monitoring occasion of the second set of one or more physical downlink control channel monitoring occasions is associated with the second control resource set pool, and wherein the second codebook generation characteristic comprises a second index associated with the second control resource set pool.

19. The apparatus of claim 17, wherein the at least one processor is further configured to:

receive, via a second uplink resource, second feedback according to a second codebook having a second codebook size that is based at least in part on a second quantity of physical downlink control channel monitoring occasions included in the second set of one or more physical downlink control channel monitoring occasions, wherein the second uplink resource is different than a first uplink resource via which the feedback is transmitted according to the first codebook having the first codebook size, and wherein each physical downlink control channel monitoring occasion of the second set of one or more physical downlink control channel monitoring occasions is associated with the second control resource set pool, the second codebook generation characteristic comprising a second index associated with the second control resource set pool.

20. The apparatus of claim 16, wherein the at least one processor is further configured to:

transmit a message that indicates a configuration of the first codebook associated with a first priority and a second codebook associated with a second priority, wherein the feedback is received according to at least the first codebook having the first codebook size, wherein each physical downlink control channel monitoring occasion of the first set of one or more physical downlink control channel monitoring occasions is associated with the first priority, and wherein the first codebook generation characteristic comprises the first priority.

21. The apparatus of claim 20, wherein, to receive the feedback, the at least one processor is further configured to:

receive, via a second uplink resource, second feedback according to the second codebook having a second codebook size that is based at least in part on a second quantity of physical downlink control channel monitoring occasions included in the second set of one or more physical downlink control channel monitoring occasions and associated with the second priority, wherein the second uplink resource is different than a first uplink resource via which the feedback is transmitted according to the first codebook having the first codebook size, and wherein each physical downlink control channel monitoring occasion of the second set of one or more physical downlink control channel monitoring occasions is associated with the second priority, the second codebook generation characteristic comprising the second priority.

22. The apparatus of claim 20, wherein the at least one processor is further configured to:

transmit, via the first set of one or more physical downlink control channel monitoring occasions, a first set of one or more downlink control information messages, wherein the first set of one or more physical downlink control channel monitoring occasions is associated with the first priority based at least in part on each downlink control information message of the first set of one or more downlink control information messages being associated with a first format and comprising a priority field configured to indicate a priority of a transmission associated with the respective downlink control information message; and transmit, via the second set of one or more physical downlink control channel monitoring occasions, a second set of one or more downlink control information messages, wherein the second set of one or more physical downlink control channel monitoring occasions is associated with the second priority based at least in part on each downlink control information message of the second set of one or more downlink control information messages being associated with the first format and comprising the priority field or being associated with a second format that does not comprise the priority field.

23. The apparatus of claim 16, wherein the at least one processor is further configured to:

transmit a message that indicates a first type of codebook associated with the first codebook generation characteristic and a second type of codebook associated with the second codebook generation characteristic, the first type of codebook comprising a physical downlink control channel monitoring occasion-based codebook, and the second type of codebook comprising one of a semi-static codebook or a dynamic codebook, wherein the feedback is received according to at least the first codebook having the first codebook size according to the first type of codebook and a second codebook having a second codebook size according to the second type of codebook and either a quantity of physical downlink shared channel reception occasions or a quantity of downlink assignment indices transmitted via the plurality of physical downlink control channel monitoring occasions.

24. The apparatus of claim 23, wherein, to receive the feedback, the at least one processor is further configured to:

receive the feedback via a same uplink resource in the second time slot according to a combination of the first codebook size associated with the first type of codebook and the second codebook size associated with the second type of codebook.

25. The apparatus of claim 23, wherein the at least one processor is further configured to:

receive, via a second uplink resource, second feedback according to the second type of codebook having the second codebook size, wherein the second uplink resource is different than a first uplink resource via which the feedback is transmitted according to the first type of codebook having the first codebook size.

26. The apparatus of claim 16, wherein the first codebook generation characteristic comprises a unicast communication type associated with the first set of one or more physical downlink control channel monitoring occasions and the second codebook generation characteristic comprises a multicast communication type associated with the second set of one or more physical downlink control channel monitoring occasions.

27. A method for wireless communication at a user equipment (UE), comprising:

receiving, in a first time slot, a downlink control information message indicating at least a second time slot for the UE to transmit feedback according to a codebook size;

monitoring a plurality of physical downlink control channel monitoring occasions within at least a subset of a plurality of time slots that occur before the second time slot, wherein the plurality of physical downlink control channel monitoring occasions comprises a first set of one or more physical downlink control channel monitoring occasions associated with at least a first codebook generation characteristic and a second set of one or more physical downlink control channel monitoring occasions associated with at least a second codebook generation characteristic;

generating a first codebook having a first codebook size based at least in part on the monitoring, wherein the first codebook size includes a quantity of bits that is equal to a total quantity of physical downlink control channel monitoring occasions included in the first set of one or more physical downlink control channel monitoring occasions, and wherein each bit of the quantity of bits included in the first codebook corresponds to a respective physical downlink control channel monitoring occasion of the first set of one or more physical downlink control channel monitoring occasions; and transmitting, via the second time slot, the feedback according to at least the first codebook size based at least in part on the monitoring.

28. The method of claim 27, further comprising:

receiving a message that indicates a configuration of a set of downlink control resources in one or more component carriers, the set of downlink control resources comprising a first subset of downlink control resources associated with a first control resource set pool and a second subset of downlink control resources associated with a second control resource set pool, wherein generating the first codebook having the first codebook size is based at least in part on the message, wherein each physical downlink control channel monitoring occasion of the first set of one or more physical downlink control channel monitoring occasions is associated with the first control resource set pool, and wherein the first codebook generation characteristic comprises a first index associated with the first control resource set pool.

29. A method for wireless communication at a network entity, comprising:

transmitting, in a first time slot, a downlink control information message indicating at least a second time slot for a user equipment (UE) to transmit feedback according to a codebook size; and receiving, via the second time slot, feedback according to at least a first codebook size, wherein a plurality of physical downlink control channel monitoring occasions occur within at least a subset of a plurality of time slots that occur before the second time slot, the plurality of physical downlink control channel monitoring occasions comprising a first set of one or more physical downlink control channel monitoring occasions associated with at least a first codebook generation characteristic and a second set of one or more physical downlink control channel monitoring occasions associated with at least a second codebook generation characteristic, wherein a first codebook having the first codebook size includes a quantity of bits that is equal to a total quantity of physical downlink control channel monitoring occasions included in the first set of one or more physical downlink control channel monitoring occasions, and wherein each bit of the quantity of bits included in the first codebook corresponds to a respective physical downlink control channel monitoring occasion of the first set of one or more physical downlink control channel monitoring occasions.

30. The method of claim 29, further comprising:

transmitting a message that indicates a configuration of a set of downlink control resources in one or more component carriers, the set of downlink control resources comprising a first subset of downlink control resources associated with a first control resource set pool and a second subset of downlink control resources associated with a second control resource set pool, wherein the feedback is received according to at least the first codebook having the first codebook size, wherein each physical downlink control channel monitoring occasion of the first set of one or more physical downlink control channel monitoring occasions is associated with the first control resource set pool, and wherein the first codebook generation characteristic comprises a first index associated with the first control resource set pool.

* * * * *